United States Patent
Vysotsky et al.

(10) Patent No.: US 11,343,185 B2
(45) Date of Patent: *May 24, 2022

(54) NETWORK TRAFFIC STEERING WITH PROGRAMMATICALLY GENERATED PROXY AUTO-CONFIGURATION FILES

(71) Applicant: Citrix Systems, Inc., Fort Lauderdale, FL (US)

(72) Inventors: Vladimir Vysotsky, Fremont, CA (US); Snigdhendu Mukhopadhyay, San Jose, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/877,971

(22) Filed: May 19, 2020

(65) Prior Publication Data
US 2020/0374229 A1 Nov. 26, 2020

Related U.S. Application Data

(63) Continuation-in-part of application No. 16/417,018, filed on May 20, 2019, now Pat. No. 10,911,310.

(51) Int. Cl.
*H04L 45/74* (2022.01)
*H04L 67/56* (2022.01)
(Continued)

(52) U.S. Cl.
CPC .......... *H04L 45/74* (2013.01); *H04L 41/0813* (2013.01); *H04L 41/12* (2013.01); *H04L 61/1511* (2013.01); *H04L 67/28* (2013.01)

(58) Field of Classification Search
CPC ..... H04L 45/74; H04L 41/0813; H04L 41/12; H04L 61/1511; H04L 67/28
See application file for complete search history.

(56) References Cited

U.S. PATENT DOCUMENTS 8,166,141 B1 4/2012 Van Horne, III
2004/0006615 A1 1/2004 Jackson
(Continued)

OTHER PUBLICATIONS

Non-Final Office Action on U.S. Appl. No. 16/417,018, dated May 6, 2020 (6 pages).
(Continued)

*Primary Examiner* — Duc C Ho
(74) *Attorney, Agent, or Firm* — Foley & Lardner LLP

(57) ABSTRACT

Described embodiments provide systems and methods for steering network traffic using dynamically generated configuration scripts. A first device may generate a configuration script for an application on the client for connecting with a server. The configuration script may specify the application to establish a direct connection or an indirect connection with the server. The first device may provide the configuration script to be invoked by the application to identify a first address to access the server based on a determination to establish the direct connection or the indirect connection. The first device may receive, from the client, an initiation request to connect with the server including the first address. The first device may determine second address by applying a routing policy to the first address. The first device may establish one of the direct connection or the indirect connection using the second address.

20 Claims, 14 Drawing Sheets

(51) Int. Cl.
*H04L 61/4511* (2022.01)
*H04L 41/12* (2022.01)
*H04L 41/0813* (2022.01)

(56) References Cited

U.S. PATENT DOCUMENTS

| | | |
|---|---|---|
| 2009/0254572 A1 | 10/2009 | Redlich et al. |
| 2011/0153721 A1 | 6/2011 | Agarwal et al. |
| 2011/0231479 A1 | 9/2011 | Boydstun et al. |
| 2011/0235508 A1* | 9/2011 | Goel ................. H04L 47/10 370/230 |
| 2014/0052838 A1 | 2/2014 | Giacomoni et al. |
| 2015/0033298 A1 | 1/2015 | Martini |
| 2015/0213251 A1* | 7/2015 | Turgeman ............. H04L 63/08 726/7 |
| 2020/0028758 A1 | 1/2020 | Tollet et al. |

OTHER PUBLICATIONS

Corrected Notice of Allowance on U.S. Appl. No. 16/417,018 dated, Oct. 6, 2020.
International Search Report and Written Opinion on International Appl. No. PCT/US2020/033582, dated Aug. 24, 2020.
Notice of Allowance on U.S. Appl. No. 16/417,018, dated Oct. 2, 2020.
International Preliminary Report on Patentability on International Appl. No. PCT/US2020/033582 dated Dec. 2, 2021.

* cited by examiner

NETWORK TRAFFIC STEERING WITH PROGRAMMATICALLY GENERATED PROXY AUTO-CONFIGURATION FILES

CROSS REFERENCE TO RELATED APPLICATIONS

The present application claims priority under 35 U.S.C. § 120 as a continuation-in-part of U.S. patent application Ser. No. 16/417,018, issued as U.S. Pat. No. 10,911,310, titled "NETWORK TRAFFIC STEERING WITH PROGRAMMATICALLY GENERATED PROXY AUTO-CONFIGURATION FILES," filed May 20, 2019, which is incorporated herein in its entirety.

FIELD OF THE DISCLOSURE

The present application generally relates to network traffic steering. In particular, the present application relates to systems and methods for steering network traffic using dynamically generated configuration scripts.

BACKGROUND

In a networked environment, clients may access resources hosted on servers through proxy or intermediary devices. Properly routing network traffic between the clients and the servers through the intermediary devices may be challenging.

BRIEF SUMMARY

This summary is provided to introduce a selection of concepts in a simplified form that are further described below in the Detailed Description. This summary is not intended to identify key features or essential features, nor is it intended to limit the scope of the claims included herewith.

A client may communicate with a server through one or more intermediary devices in a networked environment (e.g., software-defined wide-area network (SD-WAN)) to access resources hosted on the server. The intermediary devices may steer or route network traffic exchange between the client and the server in accordance with a routing policy. The routing policy may be based on one or more criteria, such as: an application or modality classification of individual traffic flow based on a configurable taxonomy, identity and access rights of the user associated with the traffic flows, location and security characteristics of the source, intermediate, and destination networks, and current availability, quality of service, and usage level of network resources among the network locations. Some of these criteria may be manually configured by system administrators, while other criteria may be automated.

The network traffic may originate from applications running on the client (e.g., a web browser). Such applications may embed or reuse web browser networking functionality, and may support both direct connections to network servers (e.g., Hypertext Transfer Protocol (HTTP) or Hypertext Transfer Protocol Secure (HTTPS) servers) or indirect connections through one or more of the intermediary devices (sometimes herein referred to as proxy devices). The determination of whether to connect directly or use one of the intermediary devices can be automated using proxy auto-config (PAC) files provided to the client. A PAC file may be a script (e.g., a JavaScript program) deployed to the application and may be used by the application to determine an access method for a particular Uniform Resource Locator (URL). For example, the PAC file may specify direct connections for one set of URLs and an intermediary device for another set of URL for indirect connections. The access methods may be manually set by system administrator for a particular network.

Once deployed to client across the network, the applications may use the PAC files to access resources references by various URLs. But steering destination addresses (or targets) for individual network flows may not correspond to the destination addresses used by the applications. The improper steering may be due to multiple reasons. First, the applications may not be configured to use the correct PAC files. Second, the information on the PAC files may become obsolete or out-of-date, leading to improper determination of access methods in retrieving resources via various URLs. Third, dynamic traffic steering criteria on the intermediary devices may not be taken into account when configuring the PAC files. Fourth, the PAC file may be incorrectly programmed, due to human error or organizational errors in the network administration process. These technical issues may exist in enterprise networking configurations with a centralized proxy or gateway through network traffic enters and leaves. But problems relating to improper steering due to misconfigured or obsolete PAC files may be exacerbated in complex network environments, such as in cloud computing systems. In such complex network environments, network traffic may be at least partially offloaded from centralized proxies and directly onto servers to minimize network latency and to enable higher quality user experience.

One approach to address some of the problems originating from such PAC files may include using an automated Application Programming Interface (API) to publish the list of domain names and Internet Protocol (IP) addresses referencing network endpoints for various services. Each time the list of domain names and IP addresses are published via the API, the PAC files may be updated. As the publication of new lists may happen as often as daily, it may be impracticable to have the system administrator manually update the PAC files. Instead, a protocol proxy service on one of the intermediary devices (e.g., a SD-WAN instance) may be used to update the PAC files to use the proxy service for all network connections. Such an implementation may provide the intermediary device flexibility for steering the traffic originated by the applications running on the clients. For each network connection handled by a built-in protocol proxy, the intermediary device may make an individual decision on whether to connect directly to the target server or to send the connection through an upstream proxy.

However, this approach may present a major efficiency challenge for the intermediary device. To achieve maximum performance, such implementations may be implemented as Layer 3 (network layer) entities in the Open Systems Interconnection (OSI) model, and maintain fairly lightweight state for each network data flow. Protocol proxies, on the other hand, may be implemented as Layer 4 (transport) to Layer 7 (application layer) entities that consume considerably more resources for stateful network flow processing. Thus, the addition of protocol proxy functionality may result in the drastic increase of resource requirements and configurations. Such an implementation may also lead to reduction maximum achievable throughput if additional resources (e.g., memory and CPU cycles) are not available.

To address these and other technical challenges in steering network traffic through intermediary devices, a portion of the proxy-specific traffic path selection logic may be implemented on the application via a configuration script. To this end, the intermediary device may dynamically generate the configuration script for traffic destination decision-making based on various policies and dynamic criteria. The generated script may be deployed as a PAC file to applications in the networks for which the intermediary device provides connectivity for the clients. The functionality of the configuration script may be further enhanced using indirection (e.g., proxy aliases with dynamic network address translation (NAT)) or bi-directional remote procedure call (RPC) via a domain name system (DNS).

Upon deployment of the configuration script, the application running on the client may select the proxy to which to direct network traffic. With proxy selection performed on the application of the client, the traffic steering on the intermediary device itself may be performed in a lightweight manner using Layer 3 functionality. The intermediary device may classify the connection made by the application relative to the taxonomy for the application based on the destination address and port in the first packet of the connection (e.g., a Transmission Control Protocol (TCP) with a synchronization (SYN) message or equivalent under User Datagram Protocol (UDP)). Following the classification, the intermediary device may determine a target destination and a network path for the flow. Once determined, the intermediary device may automatically apply the determined target destination and network path to subsequent packets, without inspecting the remainder of the flow and without maintaining a per-flow state. The intermediary device may also implement firewall rules and may perform detection and handling of non-compliant applications.

In one aspect, the present disclosure is directed to a method of steering network traffic using dynamically generated configuration scripts. A first device intermediary between a client and a second device may generate a configuration script for an application executing on the client for connecting the client with a server. The configuration script may specify the application to establish one of a direct connection with the server via the first device or an indirect connection with the server via the first device and the second device responsive to an access request to access resources on the server. The first device may provide, to the client, the configuration script to be invoked by the application executing on the client to identify a first address to access the resources on the server based on a determination to establish one of the direct connection or the indirect connection with the server responsive to the access request. The first device may receive, from the client, an initiation request to connect with the server. The initiation request may include the first address identified by the application in accordance with the configuration script. The first device may determine second address to connect with the server by applying a routing policy to the first address included in the initiation request received from the client. The routing policy may be used to modify addresses for accessing the resources on the server. The first device may establish one of the direct connection or the indirect connection between the client and the server using the second address determined by applying the routing policy to the first address included in the initiation request. The established direct connection or the indirect connection may be used to steer traffic between the client and the server.

In some embodiments, the first address may include an alias address for a plurality of second devices intermediary between the first device and the server to access the resources on the server. In some embodiments, determining the second address may include selecting the second device from a plurality of second devices intermediary between the first device and the server by applying the routing policy to the alias address. The routing policy may be used to select of one of the plurality of second devices for the alias address based on network path criteria. In some embodiments, determining the second address may include identifying the second address referencing the second device selected from the plurality of second devices by applying the routing policy.

In some embodiments, the first address may include an alias address. The alias address may include a first substring and a second substring. The first substring of the alias address may correspond a plurality of second devices intermediary between the first device and the server to access the resources on the server. The second substring of the alias address may identify service parameters to connect with the server. In some embodiments, determining the second address may include identifying the service parameters from the first substring included in the alias address of the initiation request. In some embodiments, determining the second address may include selecting the second device from the plurality of second devices by applying the routing policy to the second substring of the alias address. The routing policy may be used to select of one of the plurality of second devices based on the service parameters identified from the first substring of the alias address. In some embodiments, determining the second address may include identifying the second address referencing the second device selected from the plurality of second devices by applying the routing policy.

In some embodiments, the first device may receive, from the client, a domain name system (DNS) query encoded by the application in accordance with the configuration script. The DNS query may include a service address for the server. In some embodiments, the first device may determine to establish one of the direct connection or the indirect connection by applying the routing policy to the service address. In some embodiments, the first device may select the first address from a plurality of network addresses based on the determination of establishing one of the direct connection or the indirect connection. The plurality of addresses may include a first network address to establish the direct connection and a second network address to the indirect connection. In some embodiments, the first device may provide, to the client, a DNS response including the first address to establish one of the direct connection or the indirect connection between the client and the server. In some embodiments, determining the second address may include using the first address as the second address to connect with the server in accordance with the routing policy.

In some embodiments, the first device may receive, from the client, a domain name system (DNS) query generated by the application in accordance with the configuration script. The DNS query may include a service address for the server. In some embodiments, the first device may determine to establish the direct connection between the client and the server via the first device by applying the routing policy to the hostname in the DNS query. In some embodiments, the first device may provide, to the client, a DNS response with an indication to establish the direct connection to cause the application to initiate the direct connection by sending the initiation request including the first address specified by the configuration script for the direct connection with the server.

In some embodiments, the first device may receive, from the client, a domain name system (DNS) query generated by the application in accordance with the configuration script. The DNS query may include a service address for the server. In some embodiments, the first device may determine to establish the indirect connection between the client and the server via the first device by applying the routing policy to the hostname in the DNS query. In some embodiments, the first device may provide, to the client, a DNS response with an indication to establish the indirect connection to cause the application to initiate the indirect connection by sending the initiation request including the first address specified by the configuration script for the indirect connection with the server via the second device.

In some embodiments, the first device may receive, from the client, a domain name system (DNS) query encoded by the application in accordance with the configuration script. The DNS query may include a service address having an encoded hostname corresponding to the server. In some embodiments, the first device may find a plurality of candidate network addresses from which to determine the first address for the server using the encoded hostname from the DNS query.

In some embodiments, the configuration script may include a first proxy autoconfig (PAC) file. In some embodiments, the first device may generate, subsequent to generating the first PAC file, a second PAC file, the second PAC file specifying the application whether to establish the direct connection or the indirect connection with the server. In some embodiments, the first device may provide, to the client, the second PAC file to generate a third address to access the resources on the server on a second determination of whether to establish the direct connection or the indirect connection with the server responsive to a second access request. The third address may be different from the first address.

In some embodiments, the first device may identify a pre-generated configuration script from an external source. The pre-generated configuration script may include a plurality of routing actions. Each routing action may specify one of the direct connection or the indirect connection. In some embodiments, the first device may generate, for a script generation policy, a plurality of templates using the pre-generated configuration script, each template corresponding to one of the plurality of routing actions. In some embodiments, generating the configuration script may include generating the configuration script by selecting a template from the plurality of templates in accordance to the script generation policy based on at least one of an application profile for the application executing on the client, an account profile of a user on the application, and a network profile of the client. In some embodiments, the configuration script generated for the client may differ from a second configuration script generated for a second client.

In another aspect, the present disclosure is directed to a system for steering network traffic using dynamically generated configuration scripts. The system may include a first device having one or more processors intermediary between a client and a second device. The first device may generate a configuration script for an application executing on the client for connecting the client with a server. The configuration script may specify the application to establish one of a direct connection with the server via the first device or an indirect connection with the server via the first device and the second device responsive to an access request to access resources on the server. The first device may provide, to the client, the configuration script to be invoked by the application executing on the client to identify a first address to access the resources on the server based on a determination to establish one of the direct connection or the indirect connection with the server responsive to the access request. The first device may receive, from the client, an initiation request to connect with the server. The initiation request may include the first address identified by the application in accordance with the configuration script. The first device may determine second address to connect with the server by applying a routing policy to the first address included in the initiation request received from the client. The routing policy may be used to modify addresses for accessing the resources on the server. The first device may establish one of the direct connection or the indirect connection between the client and the server using the second address determined by applying the routing policy to the first address included in the initiation request. The established direct connection or the indirect connection may be used to steer traffic between the client and the server.

In some embodiments, the first address may include an alias address for a plurality of second devices intermediary between the first device and the server to access the resources on the server. In some embodiments, the first device may select the second device from a plurality of second devices intermediary between the first device and the server by applying the routing policy to the alias address. The routing policy may be used to select of one of the plurality of second devices for the alias address based on network path criteria. In some embodiments, the first device may identify the second address referencing the second device selected from the plurality of second devices by applying the routing policy.

In some embodiments, the first address may include an alias address. The alias address may include a first substring and a second substring. The first substring of the alias address may correspond a plurality of second devices intermediary between the first device and the server to access the resources on the server. The second substring of the alias address may identify service parameters to connect with the server. In some embodiments, the first device may identify the service parameters from the first substring included in the alias address of the initiation request. In some embodiments, the first device may select the second device from the plurality of second devices by applying the routing policy to the second substring of the alias address. The routing policy may be used to select of one of the plurality of second devices based on the service parameters identified from the first substring of the alias address. In some embodiments, the first device may identify the second address referencing the second device selected from the plurality of second devices by applying the routing policy.

In some embodiments, the first device may receive, from the client, a domain name system (DNS) query encoded by the application in accordance with the configuration script. The DNS query may include a service address for the server. In some embodiments, the first device may determine to establish one of the direct connection or the indirect connection by applying the routing policy to the service address. In some embodiments, the first device may select the first address from a plurality of network addresses based on the determination of establishing one of the direct connection or the indirect connection. In some embodiments, the first device may provide, to the client, a DNS response including the first address to establish one of the direct connection or the indirect connection between the client and the server. In some embodiments, the first device may use the first address as the second address to connect with the server in accordance with the routing policy.

In some embodiments, the first device may receive, from the client, a domain name system (DNS) query generated by the application in accordance with the configuration script. The DNS query may include a service address for the server.

In some embodiments, the first device may determine to establish the direct connection between the client and the server via the first device by applying the routing policy to the hostname in the DNS query. In some embodiments, the first device may provide, to the client, a DNS response with an indication to establish the direct connection to cause the application to initiate the direct connection by sending the initiation request including the first address specified by the configuration script for the direct connection with the server.

In some embodiments, the first device may receive, from the client, a domain name system (DNS) query generated by the application in accordance with the configuration script. The DNS query may include a service address for the server. In some embodiments, the first device may determine to establish the indirect connection between the client and the server via the first device by applying the routing policy to the hostname in the DNS query. In some embodiments, the first device may provide, to the client, a DNS response with an indication to establish the indirect connection to cause the application to initiate the indirect connection by sending the initiation request including the first address specified by the configuration script for the indirect connection with the server via the second device.

In some embodiments, the first device may receive, from the client, a domain name system (DNS) query encoded by the application in accordance with the configuration script. The DNS query may include a service address having an encoded hostname corresponding to the server. In some embodiments, the first device may find a plurality of candidate network addresses from which to determine the first address for the server using the encoded hostname from the DNS query.

In some embodiments, the configuration script may include a first proxy autoconfig (PAC) file. In some embodiments, the first device may generate, subsequent to generating the first PAC file, a second PAC file, the second PAC file specifying the application whether to establish the direct connection or the indirect connection with the server. In some embodiments, the first device may provide, to the client, the second PAC file to generate a third address to access the resources on the server on a second determination of whether to establish the direct connection or the indirect connection with the server responsive to a second access request. The third address may be different from the first address.

In some embodiments, the first device may identify a pre-generated configuration script from an external source. The pre-generated configuration script may include a plurality of routing actions. Each routing action may specify one of the direct connection or the indirect connection. In some embodiments, the first device may generate, for a script generation policy, a plurality of templates using the pre-generated configuration script, each template corresponding to one of the plurality of routing actions. In some embodiments, the first device may generate the configuration script based on at least one of an application profile for the application executing on the client, an account profile of a user on the application, and a network profile of the client. In some embodiments, the configuration script generated for the client may differ from a second configuration script generated for a second client.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 1A:
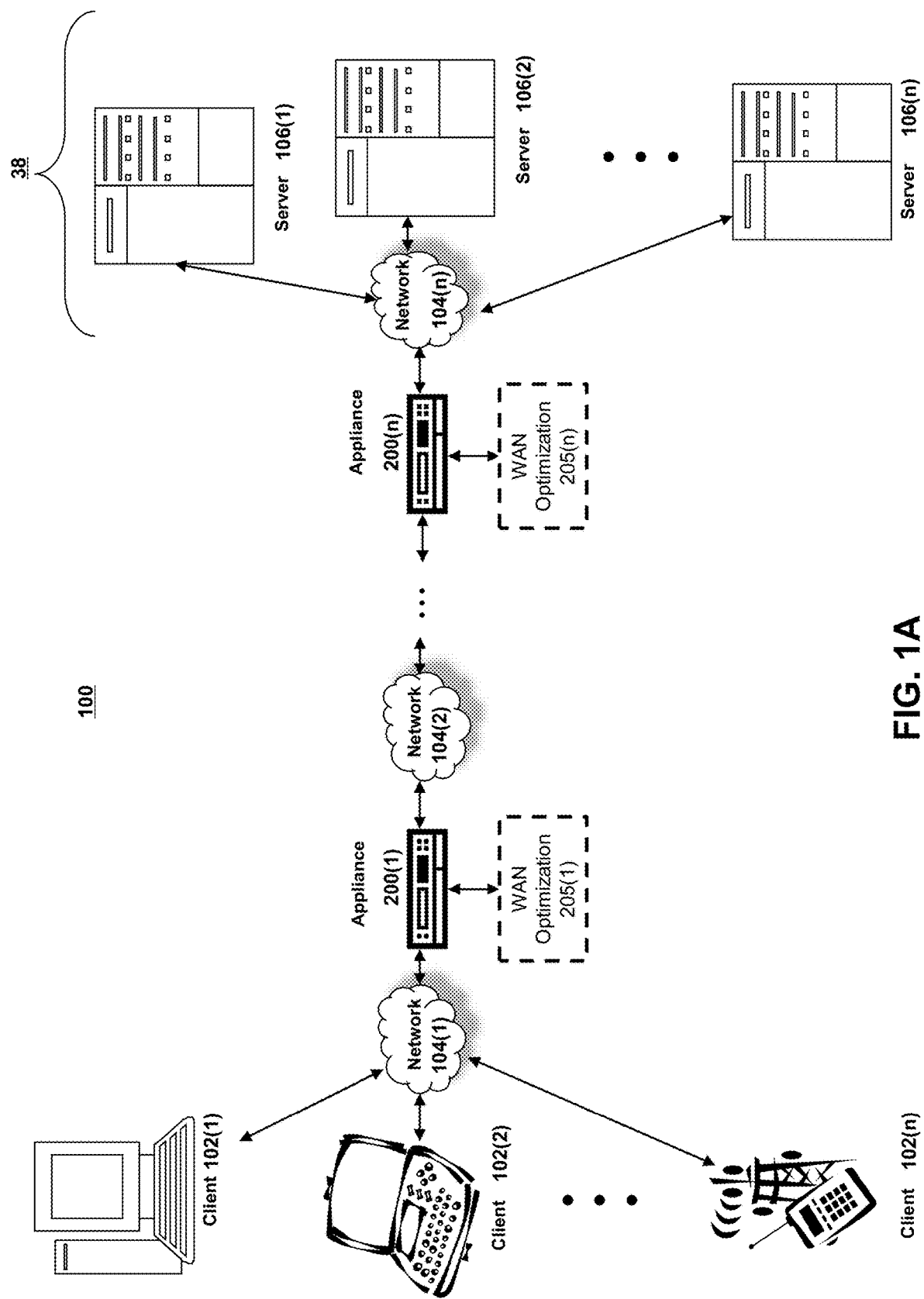
FIG. 1A is a block diagram of a network computing system, in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for steering network traffic using dynamically generated configuration scripts.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS).

In some embodiments, appliance 205 may be a performance enhancing proxy or a WAN optimization controller. In one embodiment, appliance 205 may be implemented as CloudBridge® products sold by Citrix Systems, Inc. of Fort Lauderdale, Fla.

Figure 1B:
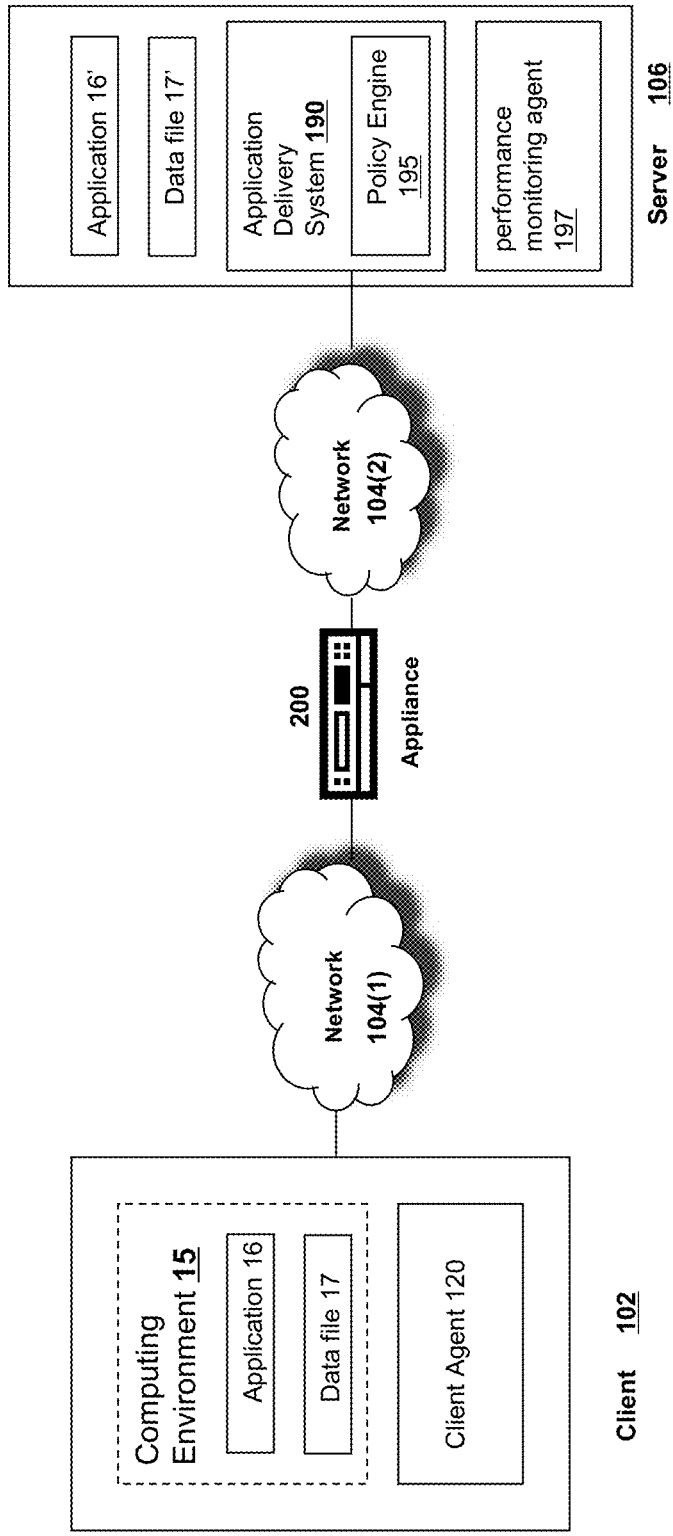
FIG. 1B is a block diagram of a network computing system for delivering a computing environment from a server to a client via an appliance, in accordance with an illustrative embodiment.

Referring to FIG. 1B, an example network environment 100' for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered to the client 102 via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 50 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
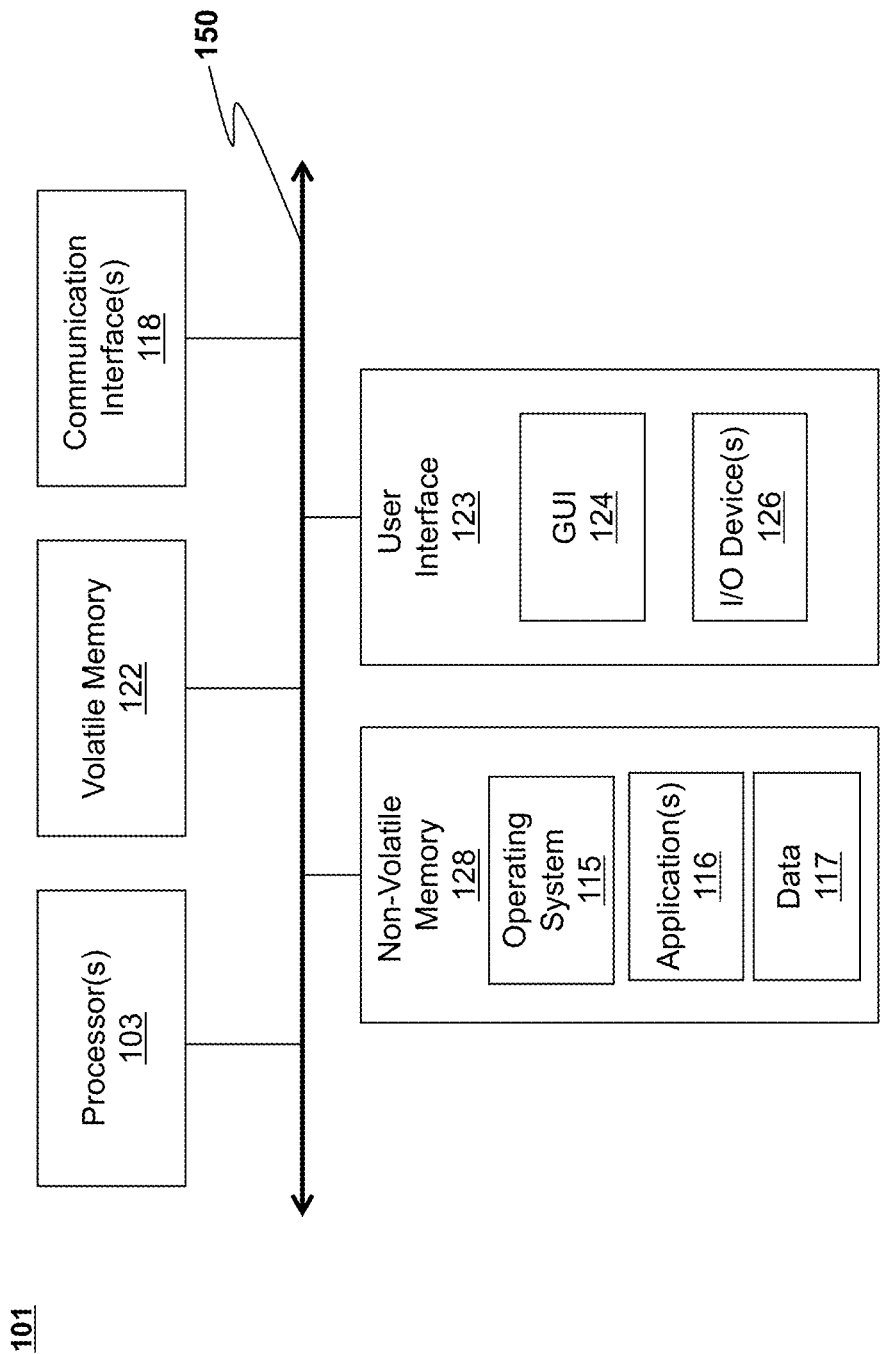
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

B. Appliance Architecture

Figure 2:
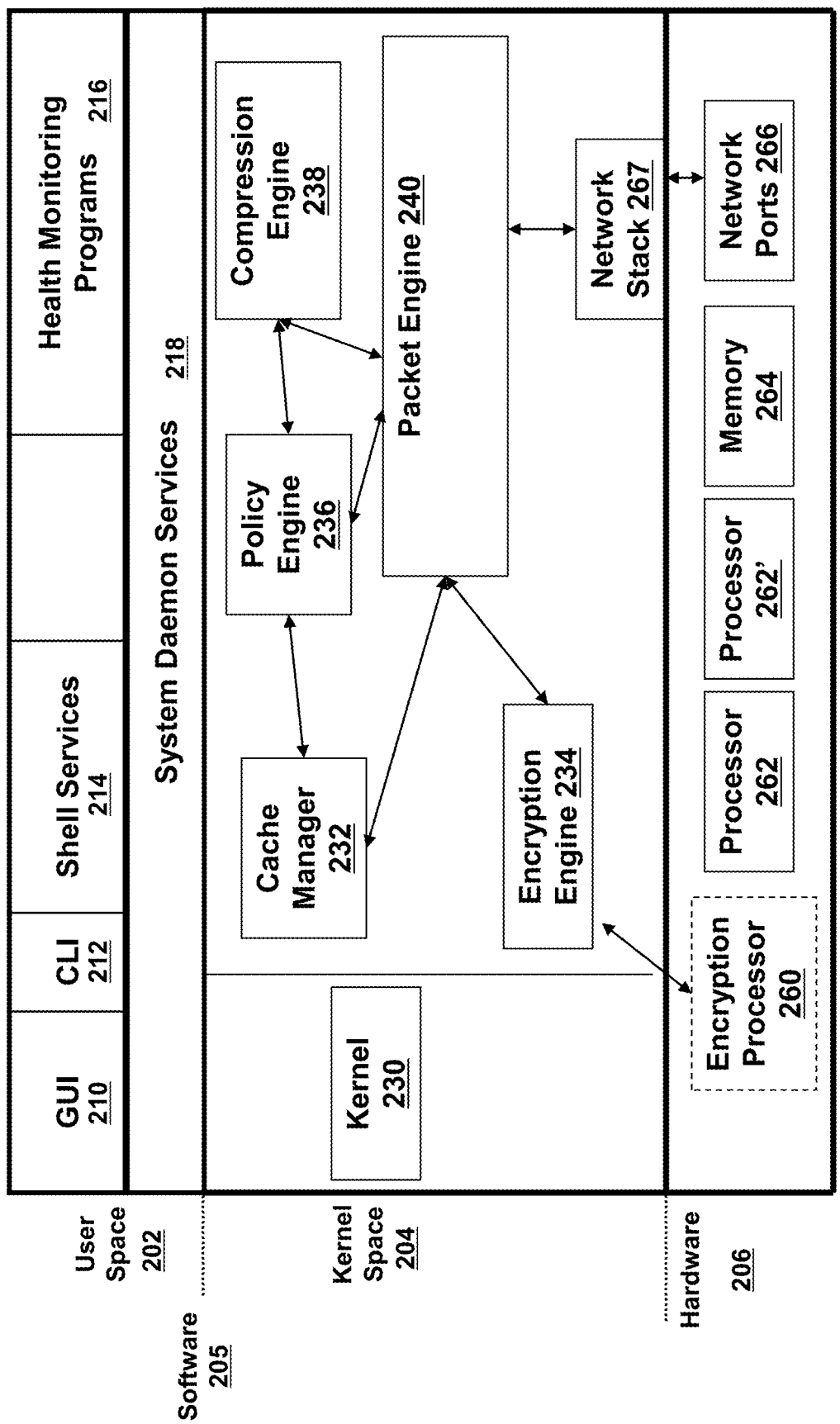
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reduce the access time of the data. In some embodiments, the cache manager 232 may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
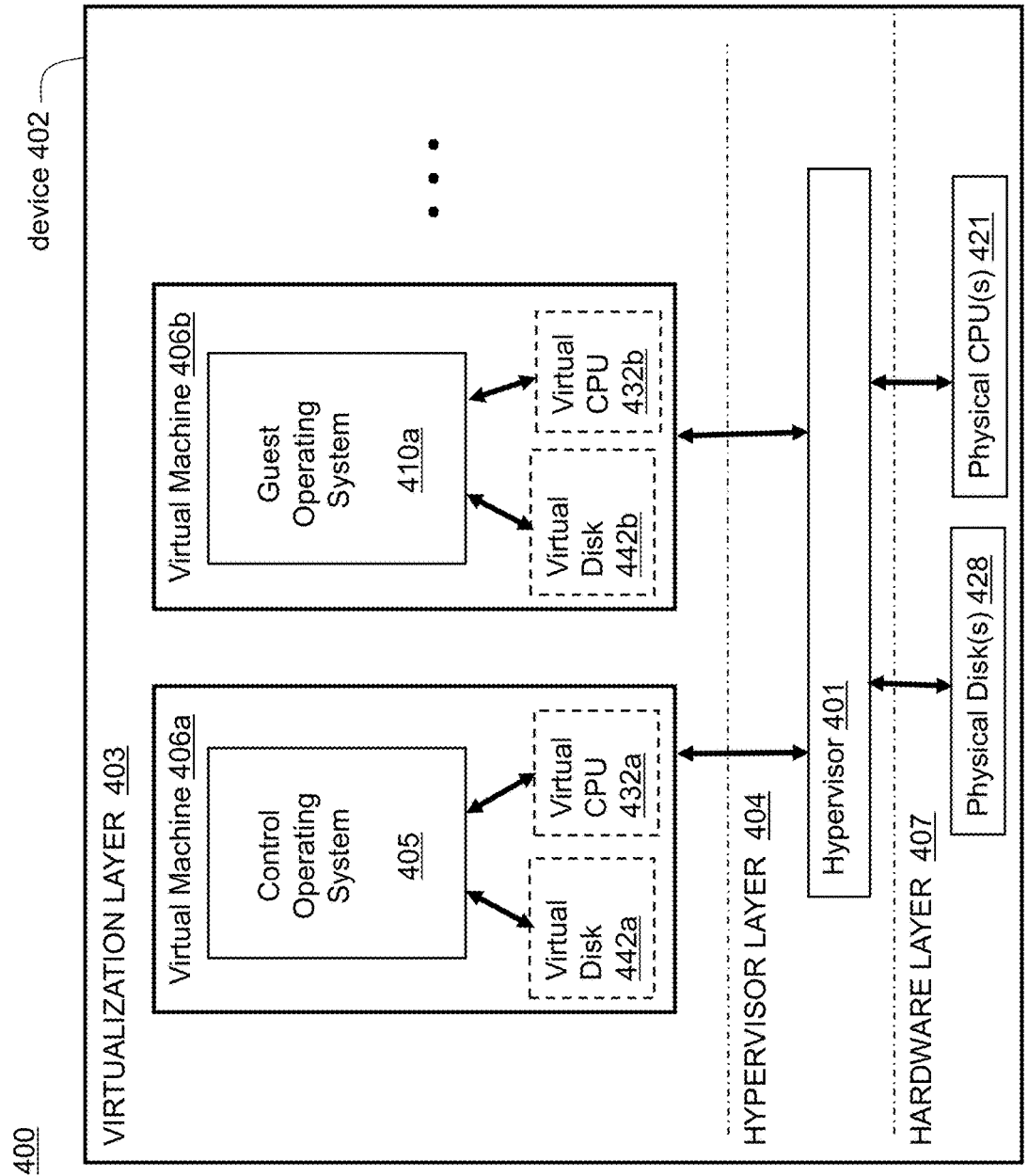
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

D. Systems and Methods for Providing a Distributed Cluster Architecture

Figure 4:
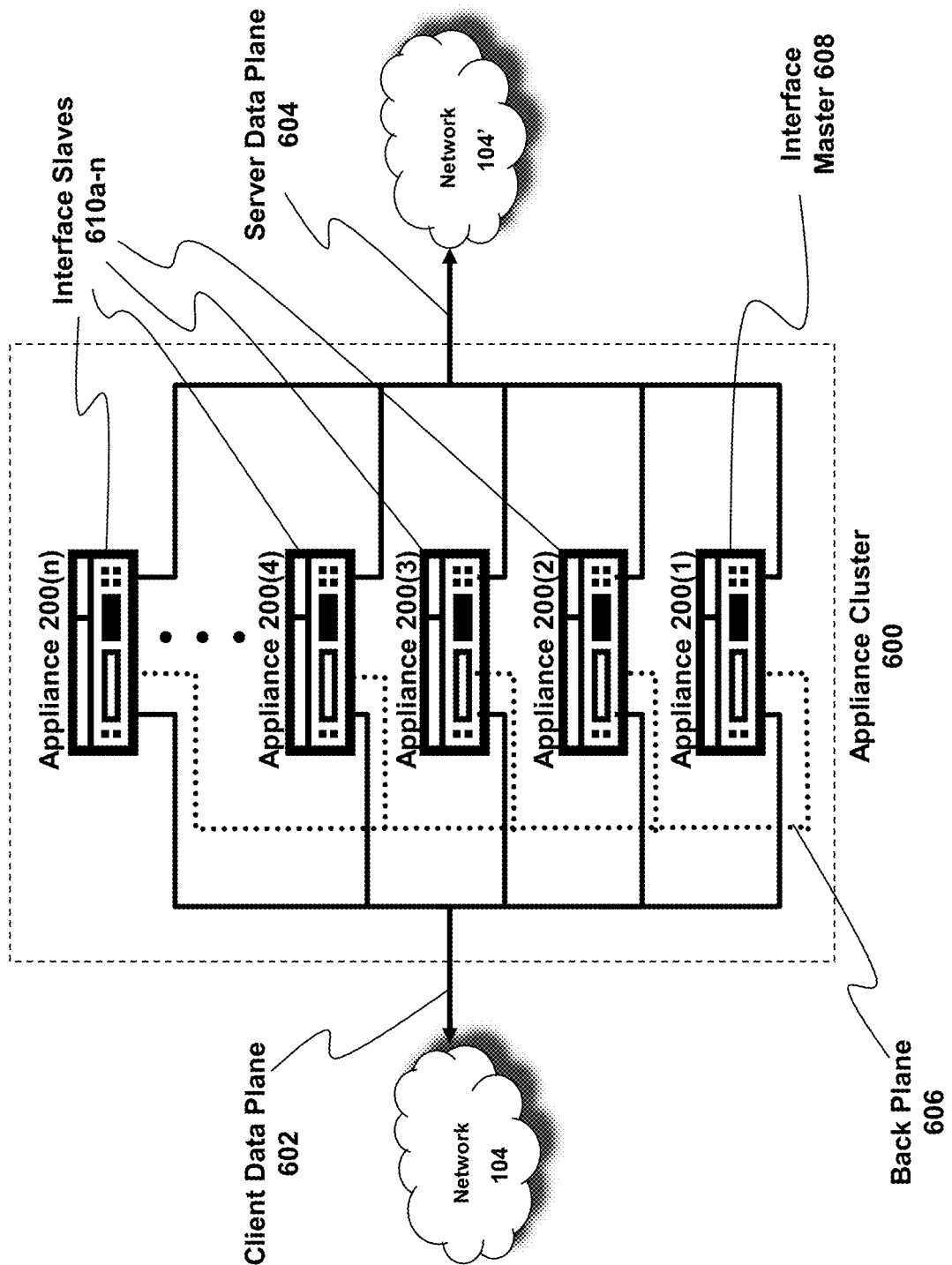
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a client-side network 104 via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104' via server data plane 404. Similar to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or backplane 406. Backplane 406 may enable inter-node or inter-appliance control and configuration messages, for inter-node forwarding of traffic, and/or for communicating configuration and control traffic from an administrator or user to cluster 400. In some embodiments, backplane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, Fla., the teachings of which are hereby incorporated herein by reference.

Figure 5:
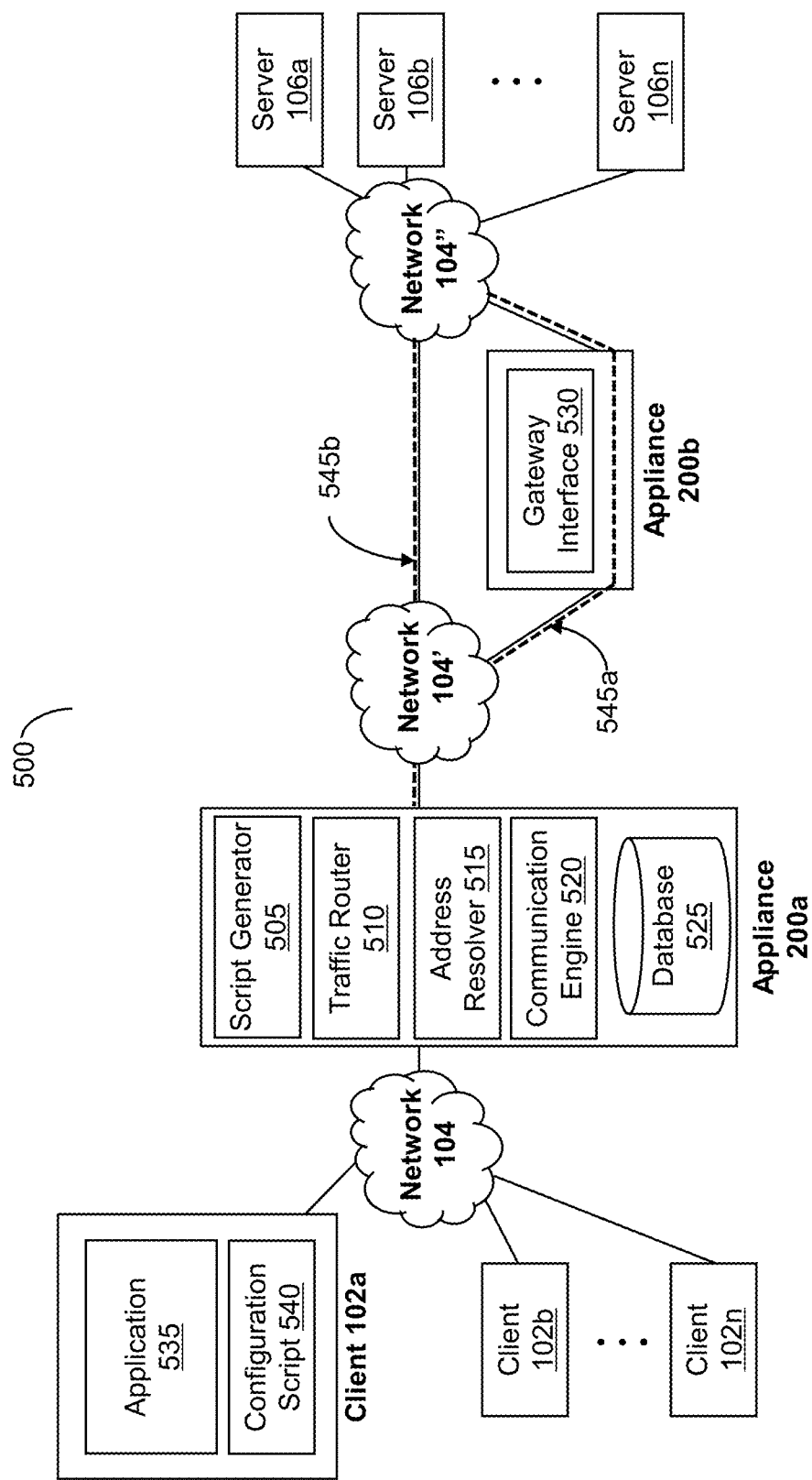
FIG. 5 is a block diagram of an embodiment of a system for steering network traffic using dynamically generated configuration scripts.

E. Systems and Methods for Steering Network Traffic Using Dynamically Generated Configuration Scripts Referring now to FIG. 5, depicted is a system 500 for steering network traffic using dynamically generated configuration scripts. In brief overview, the system 500 may include one or more clients 102a-n (hereinafter generally referred to as clients 102), one or more servers 106a-n (hereinafter generally referred to as servers 106), and one or more appliances 200a, 200b (also referred herein as intermediary devices, middle boxes, or proxy devices) deployed between the clients 102 and the servers 106. At least one client-side appliance 200a (sometimes referred herein as a first device) may include at least one script generator 505, at least one traffic router 510, at least one address resolver 515, at least one communication engine 520, and at least one database 525. At least one server-side appliance 200b (also referred herein as a gateway, a proxy service, or a second device) may include at least one gateway interface 530. The client 102 may include at least one application 535 (e.g., a web browser) for accessing resources hosted on at least one of the servers 106.

Each device or component in the system 500 may be directly or indirectly in communication with one another. The clients 102 and the client-side appliance 200a may be in communication with one another via a client-side network 104. In some embodiments, the clients 102 may reside at a branch office and the client-side network 104 may be a private network (e.g., a wired Ethernet connection, a local area network (LAN), or a wide area network (WAN)) between the clients 102 and the client-side appliance 200a. The client-side appliance 200a and the server-side appliance 200b may be in communication with one another via an intermediary network 104'. The client-side appliance 200a, the server-side appliance 200b, and the one or more servers 106 may be in communication with one another via a server-side network 104". In some embodiments, the servers 106 may reside in a data center, and the server-side network 104" may be a private network (e.g., a direct Ethernet connection, a local area network (LAN), or a wide area network (WAN)) or a public network (e.g., the Internet) between the client-side appliance 200a, the server-side appliance 200b, and the servers 106. In some embodiments, the network 104' and the network 104" may be part of a single network communicatively coupling the client-side appliance 200a, the server-side appliance 200b, and the servers 106 to one another. The appliances 200a and 200b can include or correspond to any type or form of intermediary device, network device, middle box device and/or proxy device, such as but not limited to a Netscaler device, and SD-WAN device, among others.

The systems and methods of the present solution may be implemented in any type and form of device, including clients, servers and/or appliances 200a or 200b. As referenced herein, a "server" may sometimes refer to any device in a client-server relationship, e.g., an appliance 200a in a handshake with a client device 102. The present systems and methods may be implemented in any intermediary device or gateway, such as any embodiments of the appliance 200a described herein. Some portion of the present systems and methods may be implemented as part of a packet processing engine and/or virtual server of an appliance, for instance. The systems and methods may be implemented in any type and form of environment, including multi-core appliances, virtualized environments and/or clustered environments described herein.

In further detail, the application 535 executing on the client 102 may transmit or send provide a request for proxy configuration via the network 104. The request for proxy configuration may be to retrieve a configuration script (e.g., a proxy autoconfig (PAC) file) specifying an access method to communicate across the network 104, 104', or 104". In some embodiments, the request for proxy configuration may include a device identifier corresponding to the client 102. The device identifier may uniquely identify or reference the client 102 or the application 535 executing on the client 102, or a combination of both. In some embodiments, the application 535 may generate the request for proxy configuration to send via the network 104. In some embodiments, the application 535 may send the request for proxy configuration to the client-side appliance 200a using an address referencing the client-side appliance 200a. The address may be pre-specified by the application 535 or may be specified by a group policy for clients 102 connected with the network 104. The address may be, for example, a uniform resource location (URL) referencing the client-side appliance 200a from which to retrieve the configuration script. In some embodiments, the address may specifically reference the script generator 505 running on the client-side appliance 200a.

The application 535 may identify the address using an auto-discovery protocol (e.g., web proxy auto-discovery proxy). In some embodiments, the application 535 may discover or search the client-side appliance 200a to send the request for proxy configuration in accordance to Dynamic Host Configuration Protocol (DHCP) discovery operations. The application 535 running on the client 102 may transmit or broadcast a DHCP discover message via the network 104 for the proxy configuration. The client-side appliance 200a may function as a DHCP server. In response to receipt of the DHCP discover message, the client-side appliance 200a may send back a DHCP response to the client 102 via the network 104. The DHCP response may include a specific option for the request for proxy configuration (e.g., "option 252, 'auto-proxy-config'"). The option may include the address to be used to send the request for proxy configuration. The application 535 running on the client 102 may send the request for proxy configuration for the client-side appliance 200a using the network address included in the DHCP response.

In some embodiments, the application 535 may discover or search the client-side appliance 200a to send the request for proxy configuration in accordance with Domain Name System (DNS) probing. To find the network address to which to send the request for proxy configuration, the application 535 may identify a DNS name for the client 102. The DHS name may correspond to an address for the client 102 or the network 104 with which the client 102 is communicatively coupled. The address may be a URL referencing the client 102 or the network 104. The address may, for example, reference a branch office in which the client 102 resides, and may be "host.branch.company.country.com." The application 535 may identify a set of domain names for configuration scripts. The set of domain names may be preset and may include a defined keyword (e.g., "wpad"). The application 535 may replace one or more portions of the hostname with the defined keyword to generate an address with which to probe for retrieving the configuration script. For example, starting with the local endpoint name "host.branch.company.country.com", the application 535 may sequentially attempt "wpad.branch.company.country.com", "wpad.company.country.com", and "wpad.country.com." For each generated domain name, the application 535 may attempt to resolve to a network address (e.g., an Internet Protocol (IP) address or a media access control (MAC) address) to identify the address to which to send the request for proxy configuration. In attempting to resolve, the application 535 may send a DNS request including the address to probe to the network 104.

From the client 102, the client-side appliance 200a may receive the DNS request. The client-side appliance 200a may function as a DNS server to parse the DNS request to identify the address. Based on the address including the defined keyword (e.g., "wpad"), the client-side appliance 200a may determine that the DNS request as a request for an address for use in the request for proxy configuration. The client-side appliance 200a may resolve the address in the DNS request to the network address referencing the client-side appliance 200a. In some embodiments, the client-side appliance 200a may apply firewall policies to the DNS request to restrict or block DNS requests with unrecognized domains, thereby preventing unapproved or untrusted parties from obtaining the configuration script. The client-side appliance 200a may send back a DNS response with the resolved network address for the client-side appliance 200a to the client 102. Upon receipt, the application 535 may use the resolved network address to generate and send the request for proxy configuration to the client-side appliance 200a. In some embodiments, the application 535 may send the request for proxy configuration over the HyperText Transfer Protocol (HTTP) using the network address from the DNS response.

The script generator 505 executing on the client-side appliance 200a may generate at least one configuration script 540 for the applications 535 executing on the clients 102 for communicating with one or more of the servers 106. The configuration script 540 may be an executable file, a process, a program, or otherwise a set of executable instructions to be invoked by the application 535. For example, the configuration script 540 may be a PAC file to be invoked by a web browser, and may include JavaScript code with the function "FindProxyForURL(url, host)" specifying an access method for connecting with a particular server 106 through the client-side appliance 200a. In some embodiments, the generation of the configuration script 540 may be responsive to receipt of the request for proxy configuration from the client 102 or may be independent of the receipt of the request. The configuration script 540 may specify the application 535 executing on the client 102 whether to establish an indirect connection 540a or a direct connection 540b with the server 106 via the client-side appliance 200a. The indirect connection 540a may include a communication path from the client 102 through the client-side appliance 200a and at least one of the server-side appliances 200b to connect with the server 106. The direct connection 540b may include a communication path from the client 102 through the client-side appliance 200a to connect with the server 106, without going through the server-side appliance 200b. The decision whether to establish the indirect connection 540a or the direct connection 540b as specified by the configuration script 540 may be responsive to an access request to access the server 106.

In generating the configuration script 540, the script generator 505 may acquire, gather, or otherwise identify information on the client 102. In some embodiments, the information may include an application profile corresponding to the application 535 running on the client 102. The application profile may include an application name, a version identifier, one or more application metrics, among others. The script generator 505 may identify the application 535 executing on the client 102 to identify the application name and the version identifier for the application 535. The script generator 505 may apply instrumentation on the client 102 to measure the performance metrics of the application 535 (e.g., a response time, processor usage, and memory use). In some embodiments, the information gathered for generating the configuration script 540 may include an account profile of a user operating the application 535 executing on the client 102. The account profile for the user may include an account identifier and a list of used applications, among others. The script generator 505 may identify the account identifier from authentication of the user on the client 102 or the application 535 running on the client 102. The script generator 505 may identify the list of used applications by tracking network traffic originating from the client 102 associated with the account identifier.

Furthermore, the script generator 505 may acquire, gather, or otherwise identify information on the client-side network 104 communicatively coupled with the client 102 and the client-side appliance 200a for generating the configuration script 540. The information may include a network profile for the client-side network 104. In some embodiments, the network profile may include a network address of the client 102 (e.g., IP address or MAC address). The script generator 505 may identify the network address referencing the client 102. The network address may be particular to the client-side network 104 between the client 102 and the client-side appliance 200a. In some embodiments, the network profile used for generating the configuration script 540 may include a network segmentation identifier. The network segmentation identifier may indicate a location characteristic (e.g., a branch office, enterprise, datacenter, or external) and a security zone (e.g., firewall, intrusion detection, encryption, or authentication) of the client 102. For example, as discussed above, the client 102 may reside in a branch office, and the network profile of the client 102 may reflect that the client 102 resides in the branch office and the security policies applied to network traffic originating from the branch office.

In addition, the script generator 505 may acquire, gather, or otherwise identify information on the client-side appliance 200a itself for generating the configuration script 540. In some embodiments, the information on the client-side appliance 200a may include a configuration of the client-side appliance 200a. The configuration of the client-side appliance 200a may include supported services, security protocols, path selection settings, traffic management, and visibility, among others. The supported services may indicate for which applications 535 the client-side appliance 200a can facilitate communications with the server 106. The security protocols may specify whether the client-side appliance 200a applies a firewall, deep packet inspection (DPI), intrusion detection system (IDS), or intrusion prevention system (IPS), among others, to the network traffic through the client-side appliance 200a. The path selection settings may indicate criteria (e.g., latency, packet loss, and jitter) used by the client-side appliance 200a to select communication paths. The traffic management may include bandwidth management techniques (e.g., rate limiting, scheduling, traffic classification, or restrictions) used by the client-side appliance 200a to handle network traffic. Visibility may indicate whether the clients 102 and other network nodes in the networks 104, 104', and 104" are aware of the presence of the client-side appliance 200a. In some embodiments, the information on the client-side appliance 200a may include a state information of the client-side appliance 200a. The script generator 505 may access the client-side appliance 200a to identify the supported services, security protocols, path selection settings, traffic management, and visibility of the client-side appliance 200a, among others.

In some embodiments, the state information may indicate whether the client-side appliance 200a is a stateless proxy device or a stateful proxy device. A stateless proxy device may forward communications between source and destination network devices (e.g., the client 102 and the server 106), without keeping track of a transaction state. A stateful proxy device may keep track of the transaction state (e.g., for a session between the source and destination network devices) in addition to forwarding communications between the source and destination devices. In some embodiments, the state information may include the transaction state recorded by the client-side appliance 200a. The transaction state may be for each session or connection between the client 102 and the server 106 through the client-side appliance 200a. The script generator 505 may access the client-side appliance 200a to determine whether the client-side appliance 200a is stateless proxy device or the stateful proxy device. In some embodiments, the script generator 505 may identify one or more transaction states on the client-side appliance 200a determined to be a stateful proxy device.

Using the gathered information, the script generator 505 may write or create the configuration script 540 for the application 535 executing on the client 102 in accordance to a script generation policy. In some embodiments, the writing of the configuration script 540 may be responsive to receipt of the request for proxy configuration from the client 102. In some embodiments, the script generation policy may be maintained on the database 525 on the client-side appliance 200a. The script generation policy may specify sets of templates for creating the configuration script 540 based on the information. Each template may correspond to one or more lines of instructions (e.g., script or code snippet) to insert into the configuration script 540. One set of templates may correspond to a particular set of parameters or information gathered by the script generator 505. For example, for information indicating that the client 102 resides in an enterprise network, the script generation policy may specify inclusion of templates with enterprise specific rules for securing internal traffic to the server 106. Conversely, for information indicating that the client 102 is in an external guest network, the script generation policy may specify inclusion of templates with less restrictive access to the Internet but also provide lower quality of service (QoS). In another example, in networks providing device and user authentication (such as networks utilizing 802.1X Network Access Control), the script generation policy may be customized based on endpoint type or user security group.

Each template for generating the configuration script 540 may include a conditional statement for the connection specifying a set of actions to perform. The conditional statement may include a set of addresses for one or more servers 106 under which the set of specified actions are to be performed. In some embodiments, the set of addresses may be part of the protasis ("if" portion) of the conditional statement and the set of specified actions may be part of the apodosis ("then" portion) of the conditional statement for the template. The addresses for the servers 106 may include URLs, network addresses (e.g., IP addresses or MAC addresses), or port number, among others, or any combination thereof, to uniquely reference the servers 106. The set of actions may include generating and sending an initiation request for establishing the indirect connection 545a via the server-side appliance 200b or the direct connection 545b with the server 106 using corresponding addresses.

The set of actions of the template for the configuration script 540 may include using an alias address to connect with the server-side appliance 200b for establishing the indirect connection 545a. The alias address may include a set of alphanumeric characters. The set of alphanumeric characters may reference a set of server-side appliances 200b through which the indirect connection 545a is to be established between the client 102 and the server 106. The alias address may reference or identify single server-side appliances 200b or a group of server-side appliances 200b. The alias address may, for example, include a URL or a network address (e.g., IP address, MAC address, or a port number), among others, to connect with the server-side appliance 200b through the client-side appliance 200a. The alias address may include a URL, a network address, or port number referencing or corresponding to the client-side appliance 200a to first direct the initiation request to the client-side appliance 200a (e.g., the traffic router 510). The alias address may differ from an actual address including the URL, network address, or the port number for one or more of the server-side appliances 200b.

In some embodiments, the template for the configuration script 540 may specify a fixed alias address. In some embodiments, the template for the configuration script 540 may include an alias address template to be used for generating the alias address. The alias address template may specify substrings to be included in the alias address. At least one substring of the alias address may identify or reference the set of server-side appliances 200b through which the indirect connection 545a is to be established, and may be provided with the configuration script 540. For example, the substring referencing the set of server-side appliances 200b may include a URL or a network address (e.g., IP address, MAC address, or a port number), among others. At least one substring of the alias address may correspond to or identify service parameters according to which the indirect connection 545a is to be established. The service parameters may include one or more proxy services to be utilized at the server-side appliance 200b in establishing the indirect connection 545a and maintaining communications over the indirect connection 545a. For example, the proxy services for the service parameter may include a network throughput parameter, a network latency parameter, and bandwidth utilization parameters, among others. In some embodiments, the service parameters for the proxy services may include a classification identifier for the service address (e.g., hostname or URL) of the server 106 corresponding to the access request. The classification identifier may be in accordance with a service taxonomy. The service taxonomy for the classification identifier of the service address of the server 106 may include an on-premise service, remote service (e.g., remote desktop), or a cloud service (e.g., Infrastructure as a Service (IaaS), Platform as a Service (PaaS), and Desktop as a Service (DaaS)), among others. The template for the configuration script 540 may include a list of address for each classification identifier.

The set of actions of the template for the configuration script 540 may also include querying the client-side appliance 200*a* for an address for connecting with the server 106 in an indirect connection 545*a* or a direct connection 545*b*. The query may, for example, correspond to a DNS lookup and may include sending a DNS query back to the client-side appliance 200*a* to find the address for connecting with the server. The template for the configuration script 540 may include a query template for generating the query. The query template may specify inclusion of at least a portion of the service address for the server 106 (e.g., the hostname of the URL for the server 106) into the query. In some embodiments, the query template may specify encoding at least the portion of the service address for the server 106. For example, the query template may include a mapping of hostnames for servers 106 to pseudo-hostnames for the same servers 106.

In some embodiments, the script generator 505 may generate or create the set of templates of the script generation policy for generating configuration scripts 540. To create the set of templates, the script generator 505 may identify one or more previously generated configuration scripts (e.g., PAC files). The previously generated configuration scripts may be from an external source sources besides the script generator 505 or the client-side appliance 200*a*. For example, such configuration scripts may include PAC files published by a cloud secure web gateway service for customers or end users of the service. In some embodiments, the script generator 505 may identify or gather the information associated with the previously generated configuration script (e.g., the source of the publication of the script). The script generator 505 may parse the previously generated configuration script to identify each conditional statement and one or more actions following the conditional statement. The actions may specify whether to establish the indirect connection 545*a* or the direct connection 545*b*. The script generator 505 may identify the condition statement and the one or more action identified from the previously generated configuration script as one template for the script generation policy. The script generator 505 may set the script generation policy to use the created template for the identified information.

In writing the configuration script 540, the script generator 505 may compare the gathered information to the specifications of the script generation policy. In some embodiments, the script generator 505 may create a new proxy autoconfig (PAC) file as the configuration script 540 to write onto. The script generator 505 may identify pieces of the gathered information (e.g., the application profile of the application 535, account profile of the user, network profile of the client 102, configuration of the client-side appliance 200*a*, and state information). For each piece of the gathered information, the script generator 505 may search and identify the corresponding template of the script generation policy for the piece of the information. Once found, the script generator 505 may write, insert, or otherwise include the identified template onto the configuration script 540. With the processing of all the gathered information, the script generator 505 may finalize the generation of the configuration script 540. As the clients 102 communicatively coupled with the client-side appliance 200*a* may have different gathered information, the configuration script 540 generated for one client 102 may differ from the configuration script 540 generated for another client 102. The script generator 505 may transmit, send, or provide the configuration script 540 to the client 102.

In conjunction with the generation of the configuration script 540, the script generator 505 may store and maintain the configuration script 540 onto the database 525. In some embodiments, the script generator 505 may index each configuration script 540 in the database 525 by a device identifier for the client 102 for which the configuration script 540 is generated. In some embodiments, the device identifier corresponding to the client 102 may be extracted or identified from the request for proxy configuration. In some embodiments, the configuration script 540 generated by the script generator 505 may be associated or may include metadata for the configuration script. The metadata may include an expiration time and a version identifier, among others. The expiration time may specify an amount of time or a point in time up to which the configuration script 540 is effective or valid for use. The version identifier may indicate an edition of the configuration script 540 generated by the client-side appliance 200*a*. In some embodiments, the script generation policy used by the script generator 505 may change, subsequent to the generation of at least one configuration script 540. The version identifier may reflect or indicate which iteration the generated configuration script 540 is. In some embodiments, the script generator 505 may include or insert the version identifier into the configuration script 540 or metadata associated with the configuration script 540.

With the deployment of the configuration script 540, the application 535 executing on the client 102 may store and maintain the configuration script 540 (e.g., on the hard disk, memory, or other storage of the client 102). The application 535 may monitor for an access request to the resources hosted on one or more of the servers 106. The access request may correspond to any event or command on the client 102 to retrieve resources hosted on one or more of the servers 106. The access request may, for example, correspond to a user interaction with a link on a webpage to retrieve another webpage hosted by the server 106 referenced by a service address in the link. In another example, the access request may coincide with an opening of a web application that relies on resources hosted on the server 106 or a retrieving of a remotely stored filed on the server 106. In response to detecting the access request, the application 535 may invoke the configuration script 540. In invoking the configuration script 540, the application 535 may identify the service address for the server 106 to be accessed. The service address may be, for example, a uniform resource location (URL) referencing the server 106. In some embodiments, the service address may include a file pathname (e.g., one or more directories and filename) to a specific resource hosted by the server 106. The application 535 may also identify a hostname from the URL referencing the server 106 and a port number to be used to communicate with the server using the URL. The application 535 may use or pass the identified URL, the hostname, or the port number as parameters to invoke the configuration script 540. For example, the application 535 may invoke the configuration script 540 by making the function call "FindProxyForURL(serviceURL, serviceHost:servicePort)." In some embodiments, the application 535 may pass the hostname and the port number, without the full URL for the resource hosted on the server 106, to the configuration script 540.

Once the configuration script 540 is invoked, the application 535 may determine whether to establish an indirect connection 545*a* or a direct connection 545*b* with the server 106 based on the initial address, hostname, or the port number. In some embodiments, the application 535 may identify the service address of the resource on the server 106, the hostname referencing the server 106, and the port number passed in response to the access request and in invoking the configuration script 540. To determine whether to establish the indirect connection 545a or the indirect connection 545b, the application 535 may compare the service address, hostname, or the port number against the conditional statements included in the configuration script 540. Upon matching with one of the conditional statements, the application 535 may identify the set of actions specified by the configuration script 540 for the matching conditional statement. As discussed above, the set of actions may include using an alias address to connect with the server 106 and querying the client-side appliance 200a for an address to establish a connection with the server 106.

When the set of actions identified in the configuration script 540 for the service address, hostname or port number is to use an alias address, the application 535 may determine to establish the indirect connection 545a with the server 106 via the server-side appliance 200b. In response to the determination, the application 535 may generate an initiation request to send to the clients-side appliance 200a to commence establishment of the indirect connection 545a via the server-side appliance 200b. The initiation request may include the alias address (also referred herein more generally as a first address) specified by the configuration script 540. As discussed above, the alias address may include a URL, a network address, or port number corresponding to the client-side appliance 200a to direct the initiation request to the client-side appliance 200a (e.g., the traffic router 510). To generate the initiation request, the application 535 may generate or identify the alias address from the configuration script 540 to include into the initiation request. As discussed previously, the configuration script 540 may specify a fixed alias address for one or more of the server-side appliances 200b to use in the initiation request for the indirect connection 545a. The application 535 may identify the fixed address to include in the initiation request.

In some embodiments, the application 535 may determine, identify, or generate the alias address in accordance with the alias address template specified in the configuration script 540. The configuration script 540 may specify an alias address template for generating the alias address to use in the initiation request. The alias address template may specify one substring for the set of server-side appliances 200b and another substring for the service parameters. The application 535 may identify the substring for the set of server-side appliances 200b specified in the configuration script 540 itself. In addition, the application 535 may identify the substring for the service parameters for the alias address in accordance with the configuration script 540. In some embodiments, the application 535 may identify the network throughput parameter, the network latency parameter, and the bandwidth utilization parameters for connecting with the server 106 over the indirect connection 545a. In some embodiments, the application 535 may identify or determine the classification identifier for the address for the server 106 corresponding to the access request based on the address of the server 106 (e.g., the URL or the hostname). The classification identifier may correspond to one or more of an on-premise service, a remote service (e.g., remote desktop), or a cloud service including Infrastructure as a Service (IaaS), Platform as a Service (PaaS), and Desktop as a Service (DaaS), among others. To determine the classification identifier, the application 535 may compare the address of the server 106 to a list of address specified by the configuration script 540 for each classification. Based on the comparison, the application 535 may identify the classification identifier matching the list of addresses for the address of the server 106. With the identification, the application 535 may use the substring for the set of server-side appliances 200b and the substring for the service parameters to generate the alias address in accordance with the alias address template.

With the identification of the alias address, the application 535 may generate the initiation request to send to the client appliance 200a. The initiation request may include the alias address identified or generated in accordance with the configuration script 450. In some embodiments, the application 535 may generate the initiation request in accordance with a network layer protocol. The network layer protocol may, for example, include the Transmission Control Protocol (TCP), the Internet Protocol (IP) (including IPv4 and IPv6) and the Internet Protocol Security (IPSec). The initiation request itself generated by the application 535 may be a TCP/IP SYN packet to initiate a TCP/IP three-way handshake protocol with the client-side appliance 200a. By using a network layer protocol as opposed to a transport layer or an application layer protocol, the usage of computing and network resources at the client-side appliance 200a may be reduced. Upon generation, the application 535 may send the initiation request to the client-side appliance 200 via the client-side network 104. In some embodiments, the application 535 may send the initiation request to the traffic router 510 of the client-side appliance 200a. In some embodiments, since the initiation request may include the address referencing the client-side appliance 200a, the initiation request may be routed through the network 104 to land on the client-side appliance 200a. In some embodiments, as the client-side appliance 200a resides along the communication path to the server-side appliance 200b referencing by the address in the initiation request, the initiation request may first reach the client-side appliance 200a.

The traffic router 510 executing on the client-side appliance 200a may receive the initiation request with the alias address from the client 102. In some embodiments, the traffic router 510 may intercept the initiation request sent including the alias address from the client 102. The traffic router 510 may parse the initiation request received from the client 102 to identify the alias address. With the identification of the alias address, the traffic router 510 may identify the set of server-side appliances 200b referenced by the alias address in the initiation request to connect with the server 106 via the indirect connection 545a. In some embodiments, the entire alias address may reference the set of server-side appliances 200b. In some embodiments, the traffic router 510 may parse the alias address to identify the substring referencing the set of server-side appliances 200b. The parsing of the alias address by the traffic router 510 may be in accordance with the alias address template for generating the alias address. From the set of server-side appliances 200b referenced by the alias address, the traffic router 510 may select one server-side appliance 200b through which to establish the indirect connection 545a with the server 106 in accordance with a routing policy. In some embodiments, the traffic router 510 may apply the routing policy to the alias address to select the server-side appliance 200b through which to establish the indirect connection 545a. In general, the routing policy may specify a mapping or a modification of the initial address (e.g., the alias address included in the initiation request) to another address to connect with the server 106. The routing policy may specify any number of factors in selecting the server-side appliance 200b from the set for the alias address included in the initiation request. The routing policy may be stored and maintained on the database 525. In some embodiments, the routing policy may specify one or more network parameters for the server-side appliance 200b through which the indirect connection 545b is to be established based on the alias address. The network parameters may include a network throughput, a device availability, network latency, and bandwidth availability, among others. For example, the routing policy may specify selection of a server-side appliance 200b with optimal network performance for establishing the indirect connection 545a. The routing policy may also specify a range of network throughput for one alias address and a minimum bandwidth availability for another alias address in establishing the indirect connection 545a. In some embodiments, the routing policy may also specify which server-side appliances 200b are to be used based on the classification identifier of the address of the server 106 included in the alias address of the initiation request. For example, the routing policy may specify that one server-side appliance 200b is to be used for cloud services, while another server-side appliance 200b is to be used for on-premise services.

In some embodiments, the traffic router 510 may select the server-side appliance 200b based on the network performance of each server-side appliance 200b in accordance with the routing policy for the alias address. The network performance of the server-side appliance 200b may include a network throughput, a device availability, a network latency, and a bandwidth availability, among others. The traffic router 510 may measure or otherwise identify the network performance of each server-side appliance 200b in the set. In some embodiments, the traffic router 510 may determine a receive time window and a round time trip for packets sent to the server-side appliance 200b and responses from the server-side appliance 200b to calculate the network throughput. In some embodiments, the traffic router 510 may determine whether the server-side appliance 200b is operational for the device availability. In some embodiments, the traffic router 510 may measure processing delay, routing delay, transmission delay, and propagation delay for packets set to the server-side appliance 200b to determine the network latency. In some embodiments, the traffic router 510 may measure a rate of transferring of data through the server-side appliance 200b to determine the bandwidth availability at the server-side appliance 200b.

With the identification, the traffic router 510 may compare the identified network performance of each server-side appliance 200b with the specifications of the routing policy for the alias address. Based on the comparison, the traffic router 510 may select the server-side appliance 200b corresponding to the network performance matching the specifications of the routing policy. In some embodiments, the traffic router 510 may identify or select the server-side appliance 200b with the optimum network performance in accordance with the routing policy. For example, the traffic router 510 may select the server-side appliance 200b with the lowest latency and highest throughput as specified by the routing policy. In some embodiments, the traffic router 510 may apply load balancing techniques in selecting the server-side appliance 200b from the set.

In some embodiments, to select the server-side appliance 200b, the traffic router 510 may parse the alias address to identify the substring including the service parameters in accordance with the alias address template for generating the alias address. As discussed above the service parameters may include the network throughput parameter, the network latency parameter, the bandwidth utilization specification, or the classification identifier, or any combination thereof. The routing policy may specify use of the network throughput parameter, the network latency parameter, the bandwidth utilization specification of the service parameters included in the substring of the alias address in selecting the server-side appliance 200b. In this manner, the network throughput parameter, the network latency parameter, the bandwidth utilization specification of the service parameters may override of the default specifications of the routing policy. The traffic router 510 may measure or identify the network throughput, the network latency, and the bandwidth availability for each server-side appliance 200b using the techniques described above. With the identification, the traffic router 510 may compare the identified network performance of each server-side appliance 200b with the specifications of the substring of the alias address. Based on the comparison, the traffic router 510 may identify a subset of the server-side appliances 200b corresponding to the network performance matching the specifications of the service parameters identified from the substring of the alias address. In addition, from the subset, the traffic router 510 may identify the server-side appliance 200b for the classification identifier included in the substring of the alias address as specified by the routing policy. In this manner, the traffic router 510 may find the server-side appliance 200b compatible for the classification identifier for the service to be provided at a specified network performance.

With the selected of the server-side appliance 200b, the traffic router 510 may identify or determine a proxy address (sometimes herein generally referred to as a second address) for establishing the indirect connection 545a with the server-side appliance 200b. The proxy address may include a URL or a network address (e.g., IP address, MAC address, or port number) for establishing the indirect connection 545a with the selected server-side appliance 200b. The identification or determination of the proxy address may be in accordance with the routing policy. The routing policy may include the proxy address for each server-side appliance 200b. In some embodiments, the routing policy may specify the proxy address for each server-side appliance 200b selected based on the alias address. Using the routing policy, the traffic router 510 may identify the proxy address corresponding to the selected server-side appliance 200b to be used in establishing the indirect connection 545a. In some embodiments, the traffic router 510 may identify flow parameters specified by the routing policy for the proxy address corresponding to the selected server-side appliance 200b. The routing policy may specify or include the flow parameters for each proxy address. The flow parameters for the proxy address may, for example, include a data rate for packets, traffic shaping of bandwidth of communications, and a Quality of Service (QoS) specification for the communications through the indirect connection 545, among others.

Using the identified proxy address, the communication engine 520 executing on the client-side appliance 200a may establish the indirect connection 545a with the server 106 through the selected server-side appliance 200b. To establish the indirect connection 545b, the communication engine 520 may initiate a handshake protocol (e.g., a Transmission Control Protocol (TCP) three-way handshake) with the server-side appliance 200b. In performing the handshake protocol, the communication engine 520 may send or transmit a connection request (e.g., a TCP/IP SYN packet) to the server-side appliance 200b. The connection request may include the proxy address corresponding to the server-side appliance 200b. The server-side appliance 200b may send back an acknowledgment message (e.g., a TCP/IP SYN-ACK packet). In response to receipt of the acknowledgement message, the communication engine 520 may send another acknowledgement message (e.g., a TCP/IP SYN-ACK packet) to the initiation request to the client 102. In response to the receipt of the acknowledgement message from the client-side appliance 200*a*, the application 535 running on the client 102 may send an acknowledgement message (e.g., a TCP/IP ACK packet) to the client-side appliance 200*a* to complete the handshake protocol between the client 102 and the client-side appliance 200. Upon receipt of the acknowledgment message from the client 102, the communication engine 520 on the client-side appliance 200*a* may send an acknowledgment message (e.g., a TCP/IP ACK packet) to the server-side appliance 200*b*, thereby completing the handshake protocol between the client-side appliance 200*a* and the server-side appliance 200*b*.

With the completion of the handshake protocol, the communication engine 520 may steer subsequent communications destined to the server 106 from the client 102 onto the indirect connection 545*a* to the server-side appliance 200*b*. In some embodiments, the communication engine 520 may process and forward the communications through the indirect connection 545*a* in accordance with the flow parameters specified by the routing policy for the proxy address. For example, the communication engine 520 may monitor a data transmission rate of packets through the indirect connection 545*a*, and adjust a rate of transmission of packets when detecting a deviation from the rate specified by the routing policy. The communications may include packets exchanged between the client 102 and the server 106 via the server-side appliance 200*b* through the indirect connection 545*a*. In some embodiments, the communications engine 520 may associate the established indirect connection 545*a* with the alias address. The packets from the client 102 may include the alias address as the destination address. The communication engine 520 may identify the proxy address corresponding to the alias address associated with the established indirect connection 545*a*. For each packet including the alias address from the client 102, the communication engine 520 may set the destination address to the proxy address associated with the indirect connection 545*a*. With the destination address set, the communication engine 520 may then send the packet to the server-side appliance 200*b* via the indirect connection 545*a*.

In some embodiments, the communication engine 520 may establish a tunnel between the client 102 and the server-side appliance 200*b* as the indirect connection 545*a*. To establish the tunnel, subsequent to the acknowledgment message, the application 535 running on the client 102 may send a tunnel connect message (e.g., using the HTTP CONNECT method) to the client-side appliance 200*a*. The communication engine 520 in turn may forward the tunnel connect message to the server-side appliance 200*b* to establish the tunnel through the indirect connection 545*a*. Once established, the communication engine 520 may transmit packets from the client 102 to the server-side appliance 200*b* through the tunnel of the indirect connection 545*a*. The communication engine 520 may also receive packets from the server-side appliance 200*b* through the tunnel of the indirect connection 545*a*.

Upon receipt of the packets from the client 102 via the client-side appliance 200*a*, the gateway interface 530 executing on the server-side appliance 200*b* may process each packet prior to sending to the server 106 via the indirect connection 545*a*. In some embodiments, the gateway interface 530 may apply security protocols to the packets arriving from the client 102. The security protocols may include authentication, stateful packet inspection (SPI), intrusion detection system (IDS), intrusion protection system (IPS), and encryption, among others. Once applied, the gateway interface 530 may forward the packets to the server 106. Conversely, the gateway interface 530 may process each packet arriving from the server 106 prior to sending to the client-side appliance 200*a* via the indirect connection 545*a*. The processing may include encryption and packet inspection, among others. Upon processing, the gateway interface 530 may forward the packets to the client-side appliance 200*a* through the indirect connection 545*a*.

On the other hand, when the set of actions identified in the configuration script 5450 is to query, the application 535 may query the client-side appliance 200*a* to determine whether to establish the indirect connection 545*a* or the direct connection 545*b*. The application 535 may generate a query to send to the client-side appliance 200*a* to determine whether to establish the indirect connection 545*a* or the direct connection 545*b* with the server 106. In some embodiments, the generation of the query by the application 535 may be in accordance with the query template specified by the configuration script 540. The query may, for example, include a domain name system (DNS) query (e.g., using the "dnsResolve( )" function) to identify a network address corresponding to the service address of the server 106 to be resolved or identified. The query may include at least a portion of the service address referencing the server 106 (e.g., a URL referencing the server) for which a corresponding network address is to be resolved or identified. For example, the service address included in the query may include the hostname or domain name for the server 106.

In generating the query, the application 535 may identify at least a portion of the service address corresponding to the server 106 in accordance with the configuration script 540. The portion of the service address may, for example, include a hostname for the server 106. In some embodiments, the application 535 may encode the identified portion service address for the server 106 in accordance with the configuration script 540. In some embodiments, the application 535 may use the mapping included in the configuration script 540 to identify the pseudo hostname for the hostname of the service address corresponding to the server 106. In some embodiments, the encoding may be in accordance to encryption algorithm, such as symmetric key algorithms or asymmetric key algorithm. Upon identification, the application 535 may insert the at least the portion of the service address into the query. For example, the application 535 may include the encoded hostname of the server 106 into a question portion of the DNS query. Once included, the application 535 may transmit or send the query into the network 104.

The address resolver 515 executing on the client-side appliance 200*a* may receive the query from the client 102. The address resolver 515 may intercept the query transmitted through the client-side network 104 from the client 102. In some embodiments, the address resolver 515 may function or serve as a DNS server embedded into the client-side appliance 200*a*. The address resolver 515 may function as the DNS server for the hostnames or domains corresponding the client-side appliances 200*b* and the servers 106. In this manner, the query with the service name containing the hostname of one of the servers 106 may be routed through the network 104 to arrive at the address resolver 515. In some embodiments, as the client-side appliance 200*a* resides along the communication path from the client 102 through the network 104, the query may first reach the client-side appliance 200*a*.

Upon receipt of the query, the address resolver 515 may parse the query to identify the service address of the server 106 included in the query. In some embodiments, the address resolver 515 may parse the query to identify at least a portion of the service address for the server 106 (e.g., the hostname). In some embodiments, the address resolver 515 may parse the service address for the server 106 included in the query to identify the portion of the service address (e.g., the hostname) for which to an address is to be resolved. In some embodiments, the address resolver 515 may decode the portion of the encoded service address included in the query to recover the original service address for the server 106. In some embodiments, the address resolver 515 may use the same mapping as the configuration script 540 to find the original hostname from the pseudo hostname in the query. In some embodiments, the decoding may be in accordance with an encryption algorithm, such as symmetric key algorithms or asymmetric key algorithm. In response to the receipt, the address resolver 515 may determine that the received query is a request to find a network address to which to connect with the server 106. The network address may include an IP address, a MAC address, or a port number, or any combination thereof. The address resolver 515 may invoke the traffic router 510 in determining the network address for the server 106.

By applying the routing policy to the service address identified from the query, the traffic router 510 may determine whether to establish the indirect connection 545a or the direct connection 545b with the server 106 for the client 102. In some embodiments, the determination may be responsive to receipt of the query from the client 102. For addresses (or portions thereof) identified from queries, the routing policy may specify whether to establish indirect connection 545a or the direct connection 545b. In some embodiments, the routing policy may specify establishment of the indirect connection 545a or the direct connection 545b for each service address. Using the service address identified from the query, the traffic router 510 may determine whether to establish the indirect connection 545a or the direct connection 545b from the routing policy. When the routing policy specifies the establishment of the indirect connection 545a for the service address identified from the query, the traffic router 510 may determine to establish indirect connection 545a for the service address corresponding to the server 106. Conversely, when the routing policy specifies the establishment of the direct connection 545b for the service address identified from the query, the traffic router 510 may determine to establish direct connection 545b for the service address corresponding to the server 106. The traffic router 510 may relay or return the determination to the address resolver 515.

In some embodiments, the traffic router 510 may select or determine which server-side appliance 200b with which to establish the indirect connection 545b when the routing policy specifies the establishment of the indirect connection 545b for the service address. The selection of the server-side appliance 200b may be in accordance with the network parameters for connecting with the server-side appliance 200b based on the service address. The network parameters may include a network throughput, a device availability, network latency, and bandwidth availability, among others. The routing policy may also specify a range of network throughput for one service address and a minimum bandwidth availability for another service address in establishing the indirect connection 545a. The traffic router 510 may select the server-side appliance 200b based on the network performance of each server-side appliance 200b for the service address in accordance with the routing policy. The network performance of the server-side appliance 200b may include a network throughput, a device availability, a network latency, and a bandwidth availability, among others. The traffic router 510 may measure or identify the network performance of each server-side appliance 200b using the techniques detailed herein above. With the identification, the traffic router 510 may compare the identified network performance of each server-side appliance 200b with the specifications of the routing policy for the service address. Based on the comparison, the traffic router 510 may select the server-side appliance 200b corresponding to the network performance matching the specifications of the routing policy. In some embodiments, the traffic router 510 may identify or select the server-side appliance 200b with the optimum network performance in accordance with the routing policy. For example, the traffic router 510 may select the server-side appliance 200b with the lowest latency and highest throughput as specified by the routing policy.

In some embodiments, the traffic router 510 may use a classification of the service address corresponding to the server 106 to determine whether to establish the indirect connection 545a or the direct connection 545b in accordance with the routing policy. The routing policy may specify the establishment of the indirect connection 545a or the direct connection 545b for the service address of the server 106 may be based on the classification of the service address. The service address for the server 106 may be classified in accordance with a service taxonomy. The service taxonomy for the classification of the service address corresponding to the server 106 may include an on-premise service, remote service (e.g., remote desktop), or a cloud service (e.g., Infrastructure as a Service (IaaS), Platform as a Service (PaaS), and Desktop as a Service (DaaS)), among others. For example, the routing policy may specify establishment of indirect connections 545a for addresses classified as cloud services and establishment of direct connections 545b for addresses classified as on-premise services. In some embodiments, the traffic router 510 may identify a classification identifier for the service address corresponding to the server 106. Using the identification of the classification identifier, the traffic router 510 may determine whether to establish the indirect connection 545a or the direct connection 545b from the routing policy.

Based on determination of whether to establish the indirect connection 545a or the direct connection 545b for the service address, the address resolver 515 may identify, determine, or select the network address from a set of network addresses. In some embodiments, the address resolver 515 may send a response to the client 102 indicating establishment of the indirect connection 545a or the direct connection 545b. The set of network addresses may be maintained by the address resolver 515 on the database 525. In some embodiments, the set of network address may be maintained as a DNS record in a cache on the database 525. In some embodiments, the set of network addresses may be indexed by service addresses corresponding to the different servers 106. For example, for a service address, the set of network addresses may specify one network address for the server-side appliance 200b for establishing the indirect connection 545a and another network address for the server 106 for establishing the direct connection 545b. Each network address may include an IP address, a MAC address, or a port number, among others, or any combination thereof. The set of network addresses may include at least one network address corresponding to the server-side appliance 200b through which to establish the indirect connection 545a with the server 106. The set of network addresses may include at least one network address corresponding to the server 106 with which to establish the direct connection 545*b*.

In some embodiments, the address resolver 515 may search for, identify, or find a set of candidate network addresses from which to select the network address to establish the indirect connection 545*a* or the direct connection 545*b* using the service address. In some embodiments, the finding of the candidate network addresses using the service address the may be in accordance with domain name resolution techniques. In response to the receipt of the query from the client 102, the address resolver 515 may generate a resolution query to send to DNS servers (e.g., name servers) in the networks 104' and 104" to find the candidate network addresses. Each resolution query may include the service address (or at least a portion) from the query received from the client 102. The service address included in the resolution query may be decoded from the encoded service address included in the query from the client 102. The address resolver 515 may send or transmit the resolution query to each DNS server over the network 104' or 104". The DNS server may provide a corresponding network address of the network device for the service address. The network address may include the IP address, MAC address, or the port number, among others, or any combination thereof. Using the received network addresses, the address resolver 515 may add or update the set of network addresses on the database 525. In some embodiments, the address resolver 515 may index each received network address by the service address.

When the determination is to establish the indirect connection 545*a* for the service address from the query, the address resolver 515 may select the network address of the server-side appliance 200*b* from the set of network addresses. In some embodiments, the address resolver 515 may search through the set of network addresses maintained on the database 525 using the service address from the query to select the network address. In searching, the address resolver 515 may identify a subset of network addresses for indirect connections 545*a*. From the subset, the address resolver 515 may find and select the network address corresponding to the indirect connection 545*a* for the service address. The selected network address may reference the server-side appliance 200*b* with which the indirect connection 545*a* is to be established.

Using the selected network address, the address resolver 515 may generate a resolution response to send to the client 102. In some embodiments, the resolution response may be a DNS response including the selected network address. For example, the resolution response may include a return value for the invocation of the "dnsResolve( )" function of the DNS query from application 535 executing on the client 102. In some embodiments, the address resolver 515 may encode the selected network address to include into the response to the client 102. In some embodiments, the encoded network address may be in accordance with the syntax for an IP address, a MAC address, or port number, or any combination thereof. In some embodiments, the encoding of the network address may be in accordance with the mapping for forming alias address as discussed above. The encoded network address may be the alias address for the server-side appliance 200*b*. In some embodiments, the encoding of the selected network address may be in accordance to encryption algorithm, such as symmetric key algorithms or asymmetric key algorithm. In some embodiments, the encoding of the network address may indicate the determination of establishing the indirect connection 545*a*.

For example, the address resolver 515 may use a key for indirect connections 545*a* when encoding the selected network address. In some embodiments, the address resolver 515 may store and maintain the original un-encoded network address and the encoded network address on the database 525 for the indirect connection 545*a* for the client 102. Once encoded, the address resolver 515 may insert or include the encoded network address into the resolution response. The address resolver 515 may transmit, send, or provide the resolution response including the network address to the client 102 via the client-side network 104

In some embodiments, the address resolver 515 may generate the resolution response indicating to establish the indirect connection 545*a* with the server 106 via the server-side appliance 200*b*. In some embodiments, the address resolver 515 may generate a message indicating to establish the indirect connection 545*a* to insert into the resolution response. In some embodiments, the message may be in accordance with the syntax for an IP address, a MAC address, or port number, or any combination thereof. In this manner, the message may include pseudo network address indicating to establish the indirect connection 545*a* with the server 106 via the server-side appliance 200*b*. The pseudo network address may be same as the configuration script 540 for establishing the indirect connection 545*a* for the service address corresponding to the server 106. In some embodiments, the address resolver 515 may encode the message. In some embodiments, the encoding of the network address may be in accordance with the mapping for forming alias address as discussed above. In some embodiments, the encoding of the message may be in accordance to encryption algorithm, such as symmetric key algorithms or asymmetric key algorithm. Upon generation, the address resolver 515 may insert the message into the resolution response. The address resolver 515 may transmit, send, or provide the resolution response including the message to the client 102 via the client-side network 104.

Upon receipt from the address resolver 515, the application 535 may parse the resolution response to identify the network address. In some embodiments, the application 535 may parse the resolution response to identify the encoded network address. In some embodiments, the application 535 may use the encoded network address (e.g., alias address) corresponding to the server-side appliance 200*b* to establish the indirect connection 545*a*. In some embodiments, the application 535 may decode the encoded network address using the configuration script 540. In some embodiments, the encoding of the network address may be in accordance with the mapping for forming alias address as discussed above. In some embodiments, the decoding of the encoded network address may be in accordance to encryption algorithm, such as symmetric key algorithms or asymmetric key algorithm. The decoded network address may include an IP address, a MAC address, or port number, or a combination thereof, to be used to establish the indirect connection 545*a* through the server-side appliance 200*b* to the server 106. In some embodiments, based on the decoding of the network address received in the resolution response, the application 535 may determine to establish the indirect connection 545*a*. Upon decoding using the key for indirect connections 545*a*, the application 535 may determine whether the decoded network address is well-formed (e.g., in proper syntax or in expected range of addresses or port numbers). The determination may be in accordance with the configuration script 540. When the decoded network address determined as well-formed, the application 535 may determine to establish the indirect connection 545*a*.

In some embodiments, the application 535 may parse the resolution response to identify the message, in response to the receipt from the address resolver 515. The application 535 may determine to establish the indirect connection 545a based on the message from the resolution response. To determine, the application 535 may identify the message as indicating to establish the indirect connection 545a. In some embodiments, the application 535 may decode the message using the configuration script 540. In some embodiments, the encoding of the network address may be in accordance with the mapping for forming alias address as discussed above. In some embodiments, the decoding of the encoded network address may be in accordance to encryption algorithm, such as symmetric key algorithms or asymmetric key algorithm. The application 535 may then compare the decoded message with the specifications of the configuration script 540 for decoded messages indicating indirect connections 545a. The configuration script 540 may include specifications, such as pseudo network addresses or alias address, corresponding to indirect connections 545a. When the messages match, the application 535 may determine to establish the indirect connection 545a for the service address. The application 535 may also identify the network address with which to establish the indirect connection 545a from the configuration script 540. The configuration script 540 may also specify the network address to use in establishing the indirect connection 545a for the message.

Using the identified network address, the application 535 may generate an initiation request to send to the client-side application 200a to establish the indirect connection 545a through the server-side appliance 200b with the server 106. The initiation request may include the network address identified in accordance with the configuration script 540. In some embodiments, the application 535 may generate the initiation request in accordance with a network layer protocol. The network layer protocol may, for example, include the Transmission Control Protocol (TCP), the Internet Protocol (IP) (including IPv4 and IPv6) and the Internet Protocol Security (IPSec). The initiation request itself generated by the application 535 may be a TCP/IP SYN packet to initiate a TCP/IP three-way handshake protocol with the client-side appliance 200a. By using a network layer protocol as opposed to a transport layer or an application layer protocol, the usage of computing and network resources at the client-side appliance 200a may be reduced. Upon generation, the application 535 may send the initiation request to the client-side appliance 200 via the client-side network 104. In some embodiments, the application 535 may send the initiation request to the communication engine 520 of the client-side appliance 200a. In some embodiments, since the initiation request may include the address referencing the client-side appliance 200a, the initiation request may be routed through the network 104 to land on the client-side appliance 200a. In some embodiments, as the client-side appliance 200a resides along the communication path to the server-side appliance 200b referencing by the address in the initiation request, the initiation request may first reach the client-side appliance 200a.

Subsequent to the transmission by the client 102, the communication engine 520 may receive the initiation request. Using the initiation request, the communication engine 520 may establish the indirect connection 545a with the server-side appliance 200b corresponding to the network address in the initiation request. In some embodiments, the communication engine 520 may parse the initiation request to identify the network address corresponding to the server-side appliance 200b. To establish the indirect connection 545b, the communication engine 520 may initiate a handshake protocol (e.g., a Transmission Control Protocol (TCP) three-way handshake) with the server-side appliance 200b. In performing the handshake protocol, the communication engine 520 may send or transmit a connection request (e.g., a TCP/IP SYN packet) to the server-side appliance 200b. The connection request may include the proxy address corresponding to the server-side appliance 200b. The server-side appliance 200b may send back an acknowledgment message (e.g., a TCP/IP SYN-ACK packet). In response to receipt of the acknowledgement message, the communication engine 520 may send another acknowledgement message (e.g., a TCP/IP SYN-ACK packet) to the initiation request to the client 102. In response to the receipt of the acknowledgement message from the client-side appliance 200a, the application 535 running on the client 102 may send an acknowledgement message (e.g., a TCP/IP ACK packet) to the client-side appliance 200a to complete the handshake protocol between the client 102 and the client-side appliance 200. Upon receipt of the acknowledgment message from the client 102, the communication engine 520 on the client-side appliance 200a may send an acknowledgment message (e.g., a TCP/IP ACK packet) to the server-side appliance 200b, thereby completing the handshake protocol between the client-side appliance 200a and the server-side appliance 200b.

With the completion of the handshake protocol, the communication engine 520 may steer subsequent communications destined to the server 106 from the client 102 onto the indirect connection 545a to the server-side appliance 200b. In some embodiments, the communication engine 520 may process and forward the communications through the indirect connection 545a in accordance with the flow parameters specified by the routing policy for the proxy address. For example, the communication engine 520 may monitor a data transmission rate of packets through the indirect connection 545a, and adjust a rate of transmission of packets when detecting a deviation from the rate specified by the routing policy. The communications may include packets exchanged between the client 102 and the server 106 via the server-side appliance 200b through the indirect connection 545a. In some embodiments, the communications engine 520 may associate the established indirect connection 545a with the network address from the initiation request. The packets from the client 102 may include the network address from the initiations request as the destination address. With each packet including the network address corresponding to the server-side appliance 200b, the communication engine 520 may forward and send the packet to the server-side appliance 200b via the indirect connection 545a.

In some embodiments, the communication engine 520 may establish a tunnel between the client 102 and the server-side appliance 200b as the indirect connection 545a. To establish the tunnel, subsequent to the acknowledgment message, the application 535 running on the client 102 may send a tunnel connect message (e.g., using the HTTP CONNECT method) to the client-side appliance 200a. The communication engine 520 in turn may forward the tunnel connect message to the server-side appliance 200b to establish the tunnel through the indirect connection 545a. Once established, the communication engine 520 may transmit packets from the client 102 to the server-side appliance 200b through the tunnel of the indirect connection 545a. The communication engine 520 may also receive packets from the server-side appliance 200b through the tunnel of the indirect connection 545a.

Upon receipt of the packets from the client 102 via the client-side appliance 200a, the gateway interface 530 executing on the server-side appliance 200b may process each packet prior to sending to the server 106 via the indirect connection 545a. In some embodiments, the gateway interface 530 may apply security protocols to the packets arriving from the client 102. The security protocols may include authentication, stateful packet inspection (SPI), intrusion detection system (IDS), intrusion protection system (IPS), and encryption, among others. Once applied, the gateway interface 530 may forward the packets to the server 106. Conversely, the gateway interface 530 may process each packet arriving from the server 106 prior to sending to the client-side appliance 200a via the indirect connection 545a. The processing may include encryption and packet inspection, among others. Upon processing, the gateway interface 530 may forward the packets to the client-side appliance 200a through the indirect connection 545a.

Conversely, when the determination is to establish the direct connection 545b for the service address from the query, the address resolver 515 may select the network address of the server 106 from the set of network addresses. In some embodiments, the address resolver 515 may search through the set of network addresses maintained on the database 525 using the service address from the query to select the network address. In searching, the address resolver 515 may identify a subset of network addresses for direct connections 545b. From the subset, the address resolver 515 may find and select the network address corresponding to the direct connection 545b for the service address. The selected network address may reference the server 106 with which the direct connection 545b is to established.

Using the selected network address, the address resolver 515 may generate a resolution response to send to the client 102. In some embodiments, the resolution response may be a DNS response including the selected network address. For example, the resolution response may include a return value for the invocation of the "dnsResolve( )" function of the DNS query from application 535 executing on the client 102. In some embodiments, the address resolver 515 may encode the selected network address to include into the response to the client 102. In some embodiments, the encoded network address may be in accordance with the syntax for an IP address, a MAC address, or port number, or any combination thereof. In some embodiments, the encoding of the network address may be similar to the mapping for forming alias address as discussed above. The encoded network address may be a pseudo network address for the server 106. In some embodiments, the encoding of the selected network address may be in accordance to encryption algorithm, such as symmetric key algorithms or asymmetric key algorithm. In some embodiments, the encoding of the network address may indicate the determination of establishing the direct connection 545b. For example, the address resolver 515 may use a key for direct connections 545b when encoding the selected network address. In some embodiments, the address resolver 515 may store and maintain the original un-encoded network address and the encoded network address on the database 525 for the direct connection 545b for the client 102. Once encoded, the address resolver 515 may insert or include the encoded network address into the resolution response. The address resolver 515 may transmit, send, or provide the resolution response including the network address to the client 102 via the client-side network 104

In some embodiments, the address resolver 515 may generate the resolution response indicating to establish the direct connection 545b with the server 106. In some embodiments, the address resolver 515 may generate a message indicating to establish the direct connection 545b to insert into the resolution response. In some embodiments, the message may be in accordance with the syntax for an IP address, a MAC address, or port number, or any combination thereof. In this manner, the message may include pseudo network address indicating to establish the direct connection 545b with the server 106. The pseudo network address may be same as the configuration script 540 for establishing the direct connection 545b for the service address corresponding to the server 106. In some embodiments, the address resolver 515 may encode the message. In some embodiments, the encoding of the network address may be in accordance with the mapping for forming alias address as discussed above. In some embodiments, the encoding of the message may be in accordance to encryption algorithm, such as symmetric key algorithms or asymmetric key algorithm. Upon generation, the address resolver 515 may insert the message into the resolution response. The address resolver 515 may transmit, send, or provide the resolution response including the message to the client 102 via the client-side network 104.

Upon receipt from the address resolver 515, the application 535 may parse the resolution response to identify the network address. In some embodiments, the application 535 may parse the resolution response to identify the encoded network address. In some embodiments, the application 535 may use the encoded network address (e.g., alias address) corresponding to the server 106 to establish the direct connection 545b. In some embodiments, the application 535 may decode the encoded network address using the configuration script 540. In some embodiments, the encoding of the network address may be in accordance with the mapping for forming alias address as discussed above. In some embodiments, the decoding of the encoded network address may be in accordance to encryption algorithm, such as symmetric key algorithms or asymmetric key algorithm. The decoded network address may include an IP address, a MAC address, or port number, or a combination thereof, to be used to establish the direct connection 545b with the server 106. In some embodiments, based on the decoding of the network address received in the resolution response, the application 535 may determine to establish the direct connection 545b. Upon decoding using the key for direct connections 545b, the application 535 may determine whether the decoded network address is well-formed (e.g., in proper syntax or in expected range of addresses or port numbers). The determination may be in accordance with the configuration script 540. When the decoded network address determined as well-formed, the application 535 may determine to establish the direct connection 545b.

In some embodiments, the application 535 may parse the resolution response to identify the message, in response to the receipt from the address resolver 515. The application 535 may determine to establish the direct connection 545b based on the message from the resolution response. To determine, the application 535 may identify the message as indicating to establish the direct connection 545b. In some embodiments, the application 535 may decode the message using the configuration script 540. In some embodiments, the encoding of the network address may be in accordance with the mapping for forming alias address as discussed above. In some embodiments, the decoding of the encoded network address may be in accordance to encryption algorithm, such as symmetric key algorithms or asymmetric key algorithm. The application 535 may then compare the decoded message with the specifications of the configuration script 540 for decoded messages indicating direct connections 545*b*. The configuration script 540 may include specifications, such as pseudo network addresses or alias address, corresponding to direct connections 545*b*. When the messages match, the application 535 may determine to establish the direct connection 545*b* for the service address. The application 535 may also identify the network address with which to establish the direct connection 545*b* from the configuration script 540. The configuration script 540 may also specify the network address to use in establishing the direct connection 545*b* for the message.

Using the identified network address, the application 535 may generate an initiation request to send to the client-side application 200*a* to establish the direct connection 545*b* with the server 106. The initiation request may include the network address identified in accordance with the configuration script 540. In some embodiments, the application 535 may generate the initiation request in accordance with a network layer protocol. The network layer protocol may, for example, include the Transmission Control Protocol (TCP), the Internet Protocol (IP) (including IPv4 and IPv6) and the Internet Protocol Security (IPSec). The initiation request itself generated by the application 535 may be a TCP/IP SYN packet to initiate a TCP/IP three-way handshake protocol with the client-side appliance 200*a*. By using a network layer protocol as opposed to a transport layer or an application layer protocol, the usage of computing and network resources at the client-side appliance 200*a* may be reduced. Upon generation, the application 535 may send the initiation request to the client-side appliance 200 via the client-side network 104. In some embodiments, the application 535 may send the initiation request to the communication engine 520 of the client-side appliance 200*a*. In some embodiments, since the initiation request may include the address referencing the client-side appliance 200*a*, the initiation request may be routed through the network 104 to land on the client-side appliance 200*a*. In some embodiments, as the client-side appliance 200*a* resides along the communication path to the server 106 referencing by the address in the initiation request, the initiation request may first reach the client-side appliance 200*a*.

Subsequent to the transmission by the client 102, the communication engine 520 may receive the initiation request. Using the initiation request, the communication engine 520 may establish the direct connection 545*b* with the server 106 corresponding to the network address in the initiation request. In some embodiments, the communication engine 520 may parse the initiation request to identify the network address corresponding to the server 106. To establish the indirect connection 545*b*, the communication engine 520 may initiate a handshake protocol (e.g., a Transmission Control Protocol (TCP) three-way handshake) with the server 106. In performing the handshake protocol, the communication engine 520 may send or transmit a connection request (e.g., a TCP/IP SYN packet) to the server 106. The connection request may include the proxy address corresponding to the server 106. The server-side appliance 200*b* may send back an acknowledgment message (e.g., a TCP/IP SYN-ACK packet). In response to receipt of the acknowledgement message, the communication engine 520 may send another acknowledgement message (e.g., a TCP/IP SYN-ACK packet) to the initiation request to the client 102. In response to the receipt of the acknowledgement message from the client-side appliance 200*a*, the application 535 running on the client 102 may send an acknowledgement message (e.g., a TCP/IP ACK packet) to the client-side appliance 200*a* to complete the handshake protocol between the client 102 and the client-side appliance 200. Upon receipt of the acknowledgment message from the client 102, the communication engine 520 on the client-side appliance 200*a* may send an acknowledgment message (e.g., a TCP/IP ACK packet) to the server 106, thereby completing the handshake protocol between the client-side appliance 200*a* and server 106.

With the completion of the handshake protocol, the communication engine 520 may steer subsequent communications destined to the server 106 from the client 102 onto the direct connection 545*b*. In some embodiments, the communication engine 520 may process and forward the communications through the direct connection 545*b* in accordance with the flow parameters specified by the routing policy for the proxy address. For example, the communication engine 520 may monitor a data transmission rate of packets through the direct connection 545*b*, and adjust a rate of transmission of packets when detecting a deviation from the rate specified by the routing policy. The communications may include packets exchanged between the client 102 and the server 106 via the direct connection 545*b*. In some embodiments, the communications engine 520 may associate the established direct connection 545*b* with the network address from the initiation request. The packets from the client 102 may include the network address from the initiations request as the destination address. With each packet including the network address corresponding to the server 106, the communication engine 520 may forward and send the packet to the server 106 via the direct connection 545*b*. For example, the communication engine 520 may receive a HTTP GET request from the client 102 including the network address referencing the server 106. Because the request includes the network address of the server 106, the communication engine 520 may forward the HTTP GET request to the server 106 and the networks 104' or 104'' may route the request to the server 106.

Subsequent to the generation of at least one configuration script 540, the script generator 505 may generate another version of the configuration script 540 for the application 535 running on the client 102. The generation of the next version of the configuration script 540 may be in a similar manner as described above with the previous configuration script 540. The new configuration script 540 may have specifications different from the previous configuration script 540. With different configurations, the configuration script 540 may specify different addresses or access methods for establishing the indirect connection 545*a* or the direct connection 545*b*. In some embodiments, the new configuration script 540 may specify an alias address for establishing the indirect connection 545*b* that is different from the alias address of the previous configuration script 540. In some embodiments, the new configuration script 540 may specify different conditions for querying the client-side appliance 200*a* for the address for connecting with the server 106 in the indirect connection 545*a* or the direct connection 545*b*.

In some embodiments, the script generator 505 may receive a request for proxy configuration from the application 535 executing on the client 102, subsequent to receiving at least one other configuration script 540. The application 535 running on the client 102 may generate the request for proxy configuration, subsequent to receiving at least one configuration script 540. In some embodiments, the application 535 may generate the request for proxy configuration in response to determining that the expiration time for the previous configuration script 540 has elapsed. In some embodiments, the request for proxy configuration may include a version identifier of the configuration script 540 loaded on the client 102. The script generator 505 may compare the version identifier included in the request to a current version of the configuration script 540. If the version identifiers match, the script generator 505 may send a response indicating that the configuration script 540 is up-to-date. In response to receipt of the response, the application 535 may continue using the configuration script. On the other hand, if the version identifiers do not match, the script generator 505 may identify the current version of the configuration script 540. In some embodiments, the script generator 505 may regather the information for generating a new configuration script 540. The script generator 505 may generate the new configuration script 540 using the gathered information in the manner as previously discussed. The newly generated configuration script 540 may be the current version. Between different versions, the configuration script 540 may have different specifications in determining whether to establish the indirect connection 545a or the direct connection 545b with the server 106. The script generator 505 may transmit, send, or provide the configuration script 540 to the client 102.

Figure 6:
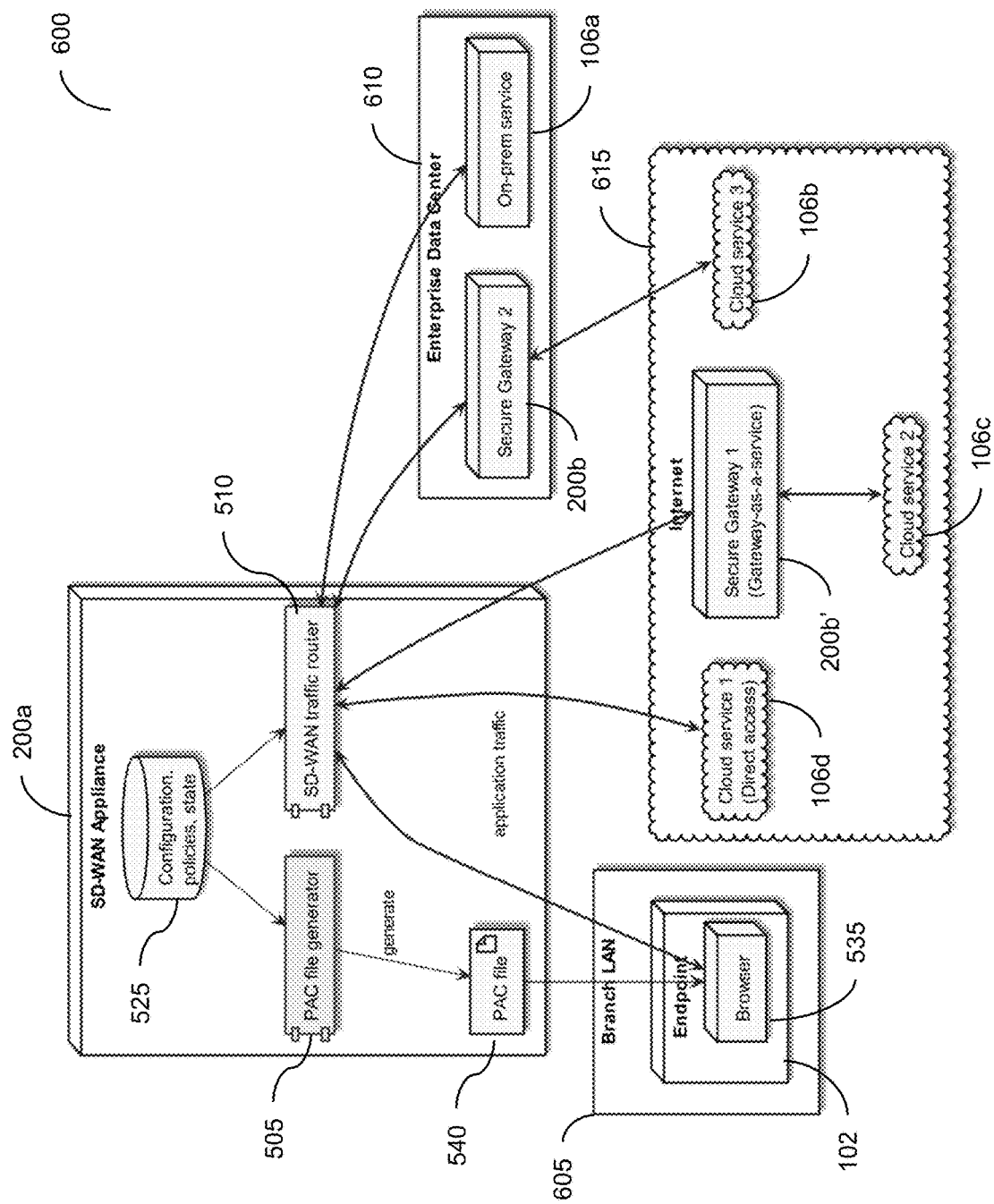
FIG. 6 is a component diagram of an embodiment of a system for system for steering network traffic using dynamically generated configuration scripts in a use case environment.

Referring now to FIG. 6, depicted is a component diagram of the system 500 for steering network traffic using dynamically generated configuration scripts in a use case environment 600. The environment 600 may include one or more components of the system 500 as detailed above, such as: the client-side appliance 200a (also referred herein as a SD-WAN appliance) including the script generator 505 (also referred herein as a PAC file generator), the traffic router 510 (also referred herein as an SD-WAN traffic router), the database 525 (including configurations, rules, and policies), and the configuration file 540 (e.g., the PAC file); the client 102 including the application 535 (e.g., a browser); a set of servers 106a-d; and a set of server-side appliances 200b and 200b' (also referred herein as a secure gateway). The environment 600 may also include at least one branch local area network (LAN) 605, at least one enterprise data center 610, and at least one cloud network 615. The branch LAN 605 may correspond to the client-side network 104. The cloud network 615 may correspond to the intermediary network 104' or the server-side network 104", or both.

The appliance 200a (sometimes herein referred as an SD-WAN appliance) may be deployed on the edge of the branch LAN 605 and may act as a network protocol router for the branch network (e.g., the network 104). All network connections originating within the branch LAN 605 may pass through the appliance 200a on their way to the rest of the enterprise network 610 or the Internet 615. The appliance 200a may include and execute the PAC file generator 505 responsible for programmatically generating and serving a PAC file 540 suitable for browsers 535 in that branch LAN 605. The PAC file generator 505 executing on the appliance 200a may use SD-WAN configuration, policies, state, and other criteria, to generate JavaScript code for the PAC file 540. In some embodiments, the PAC file generator 505 may be implemented as a web service component in any suitable programming language and web service environment. For example, the PAC file generator 505 may be implemented using Perl script invoked through a CGI mechanism from an Apache web server. The browsers 535 (e.g., applications that use browser engines and policies for networking) on all endpoints 102 within the branch LAN 605 may use the PAC file 540 served by the appliance 200a. The retrieval of the PAC file 540 by the browsers 535 can be done through manual configuration, such as by using a policy mechanism (such as group policies), or by supporting one of the auto-discovery mechanisms (DHCP or DNS).

When invoked by a request from a browser 535 within the LAN branch 605, the PAC file generator 505 may collect information about the request, including endpoint location (e.g., IP address, subnet, or security zone), browser, endpoint information, and user identity, among others. The PAC file generator 505 may also access SD-WAN configuration and state information to determine the algorithm is to be implemented by the PAC file 540. The PAC file generator 505 may generate a JavaScript program with the main PAC file function "FindProxyForURL(url, host)." The PAC file generator 505 may return the generated PAC file 540 to the requesting browser. The response from the PAC file generator 505 may be appropriately formatted and marked with content type and other metadata to be compatible with all supported browsers 535. Furthermore, the PAC file generator 505 may implement caching to reuse generated PAC files for multiple requests. The PAC file generator 505 may further log actions for monitoring and audit. PAC files 540 returned to the browser 535 may be identified with expiration time and other metadata to ensure that the browser would request an updated PAC file when appropriate.

The browsers 535 may invoke the generated PAC file 540 for all networking operations. The logic in the PAC file 540 may determine whether the browsers 535 should attempt a direct connection 545b or use a specified proxy to establish an indirect connection 545a. Thus, the appliance 200a may indirectly execute some of traffic steering logic within the browser 535. The appliance 200a may receive all network packets for all network connections originated by browsers 535 in the branch LAN 605. The appliance 200a may apply firewall, quality of service (QoS), and dynamic steering logic to such connections, as well as collecting connection statistics for additional monitoring or analytics.

Since not all browsers 535 in the branch LAN 605 may conform to the desired PAC file policy, the appliance 200a may also detect and appropriately handle connections from misconfigured on non-conformant browsers 535. In particular, the appliance 200a may execute firewall rules to block PAC file retrieval from other sources when programmatically generated PAC file 540 functionality is enabled. In addition, the firewall rules may block direct network access that would be forbidden by PAC file 540 logic, and may block connections to proxies that not included the PAC file 540.

Figure 7A:
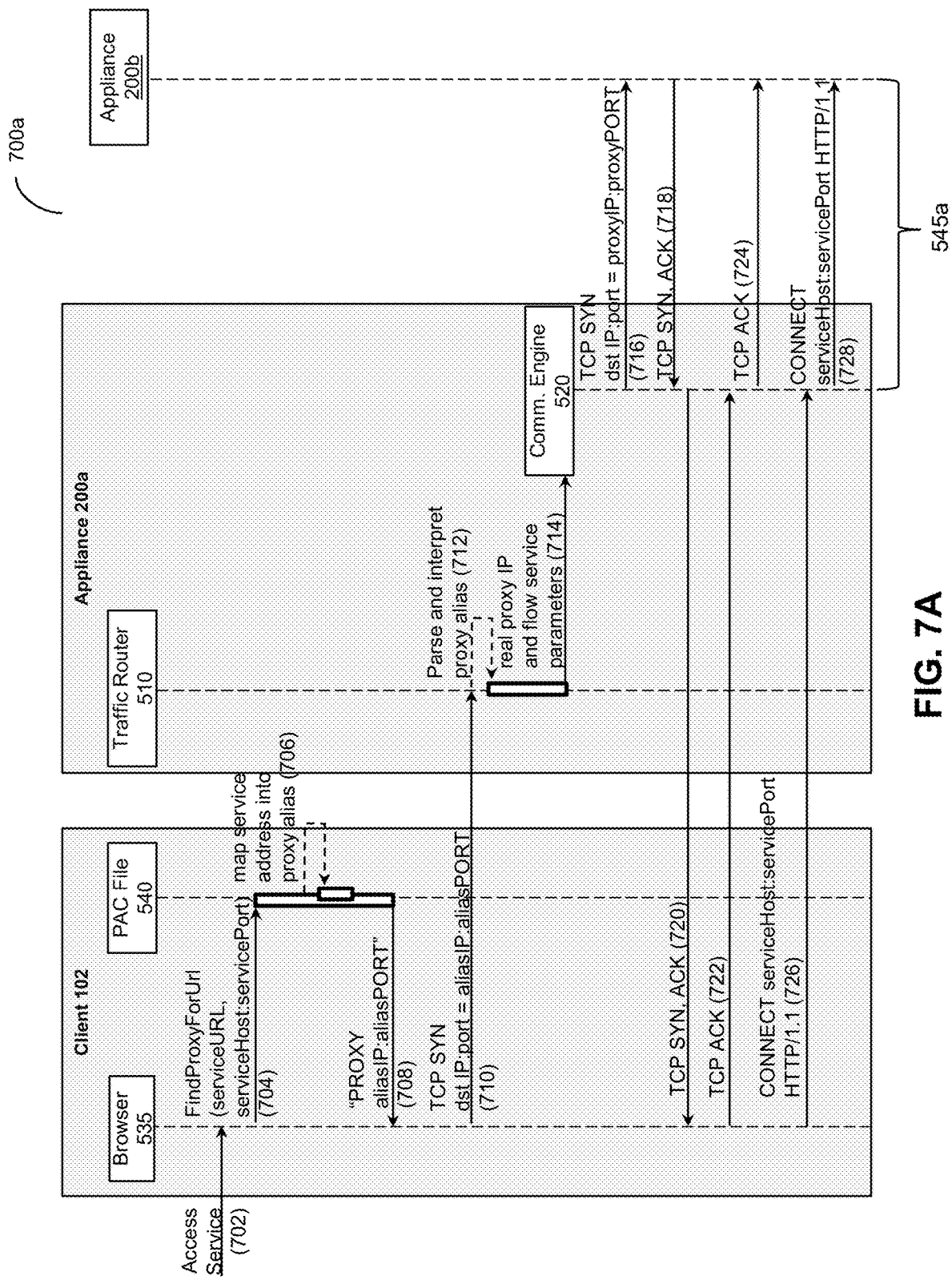
FIG. 7A-7C are sequence diagrams of an embodiment of a process for steering network traffic using dynamically generated configuration scripts.

Referring now to FIG. 7A, depicted is a sequence diagram of a process 700a for steering network traffic using dynamically generated configuration scripts. The process 700a may be implemented using or performed by the components described above in FIGS. 1-6. The process 700a may correspond to the operations performed by the client 102, the appliance 200a, the appliance 200b, and the server 106 in establishing the indirect connection 545a using proxy alias addresses. Under process 700a, the browser 535 may receive an access request (702). The browser 535 may invoke the PAC file 540 by calling "FindProxyForUrl(serviceURL, service Host:servicePort)" (704). Using the PAC file 540, the browser 535 may map a service address into a proxy alias (706). The PAC 540 may return the alias address including an IP address and a port number to the browser 535 (708). Using the alias address, the browser 535 may send an initiation request (710). The traffic router 510 on the appliance 200a may parse and interpret the proxy alias (712). The traffic router 510 may find an actual IP proxy address and flow service parameters from parsing the proxy alias (714). Using the proxy IP address and the flow service parameters, the communication engine 520 may send a connection request including an IP address and a port number to the appliance 200*b* to establish the indirect connection 545*a* (716). The appliance 200*b* may in turn respond with an acknowledgement (718). The communication engine 520 may forward the acknowledgement to the client 102 (720). The client 102 may also respond with an acknowledgment to send to the appliance 200*a* (722). The communication engine 520 may send an acknowledgment from the client 102 onto the appliance 200*b* (724). The client 102 may send a tunnel establishment request including the hostname and the port number for the server 106 to the appliance 200*a* (726). The communication engine 520 may forward the tunnel establishment request from the client 102 to the appliance 200*b* to communicate over the indirect connection 545*a* (728).

Figure 7B:
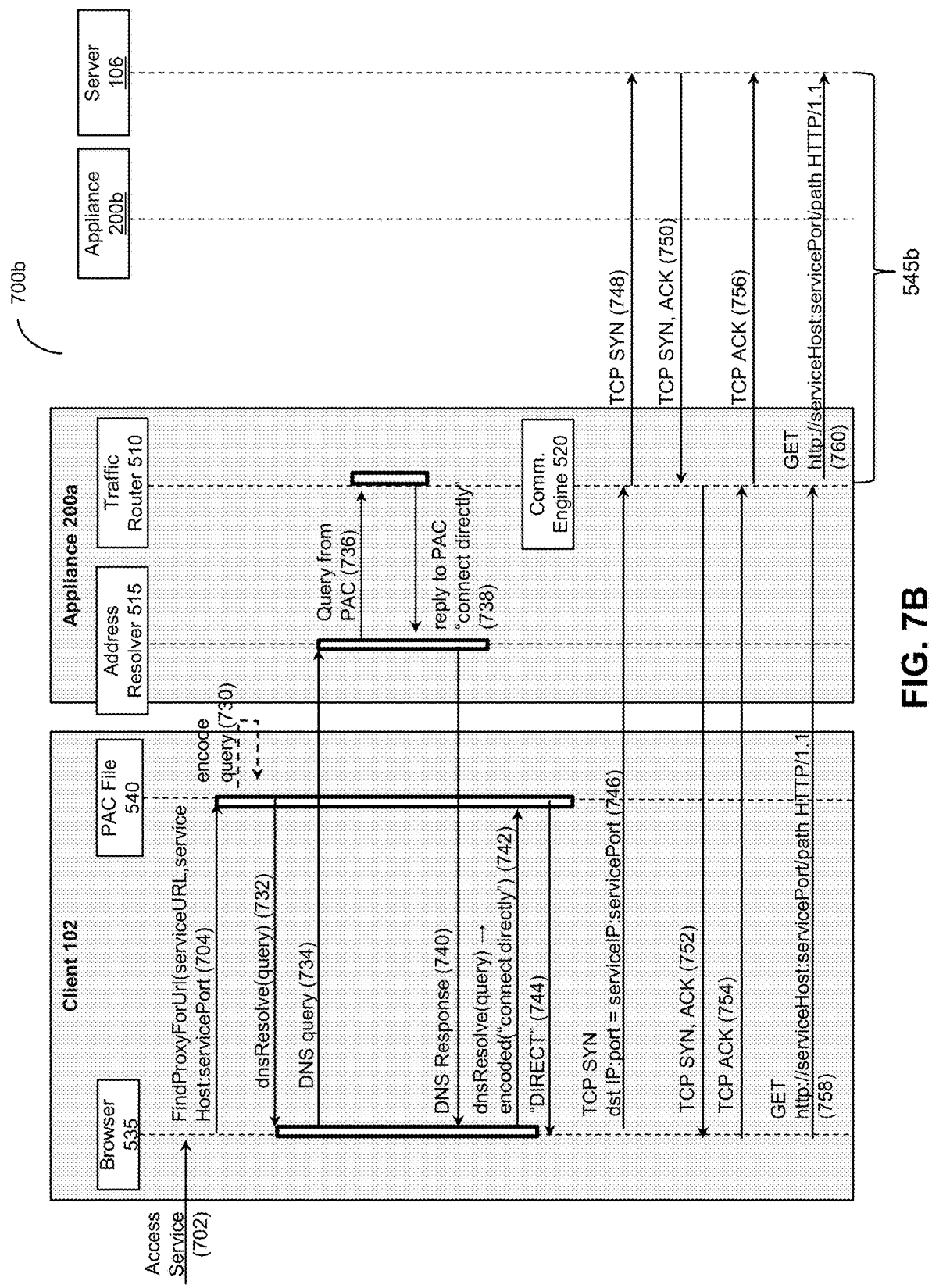

Referring now to FIG. 7B, depicted is a sequence diagram of a process 700*b* for steering network traffic using dynamically generated configuration scripts. The process 700*b* may be implemented using or performed by the components described above in FIGS. 1-6. The 700*b* may correspond to the operations performed by the client 102, the appliance 200*a*, the appliance 200*b*, and the server 106 in establishing the direct connection 545*b* using querying. Under process 700*b*, the browser 535 may receive an access request (702). The browser 535 may invoke the PAC file 540 by calling "FindProxyForUrl(serviceURL, service Host:servicePort)" (704). The PAC file 540 may determine to encode a query (730). Based on the determination, the PAC file 540 may return a DNS resolve with the query (732). The browser 535 may send a DNS query to the appliance 200*a* (734).

The address resolver 515 may forward the query to the traffic router 510 (736). The traffic router 510 may determine to establish the direct connection 545*b* (738). The address resolver 515 may send a DNS response indicating the direct connection 545*b* (740). The browser 535 may invoke the PAC 540 using the DNS indicating establishment of the direct connection 545*b* (742). The PAC file 540 may return a network address for the direct connection 545*b* (744). Using the network address, the browser 535 may send an initiation request including an IP address and a port number to the server 106 (746). The communication engine 520 may send a connection request to the server 106 (748). The server 106 may in turn respond with an acknowledgement (750). The communication engine 520 may forward the acknowledgement to the client 102 (752). The client 102 may also respond with an acknowledgment to send to the appliance 200*a* to complete the three-way handshake between the client 102 and the appliance 200*a* (754). The communication engine 520 may send an acknowledgment from the client 102 to the server 106 to complete the three-way handshake between the appliance 200*a* and the server 106 (756). The client 102 may send a request including the hostname and the port number for the server 106 to the appliance 200*a* (758). The communication engine 520 may forward the request from the client 102 to the server 106 to communicate over the direct connection 545*b* (760).

Figure 7C:
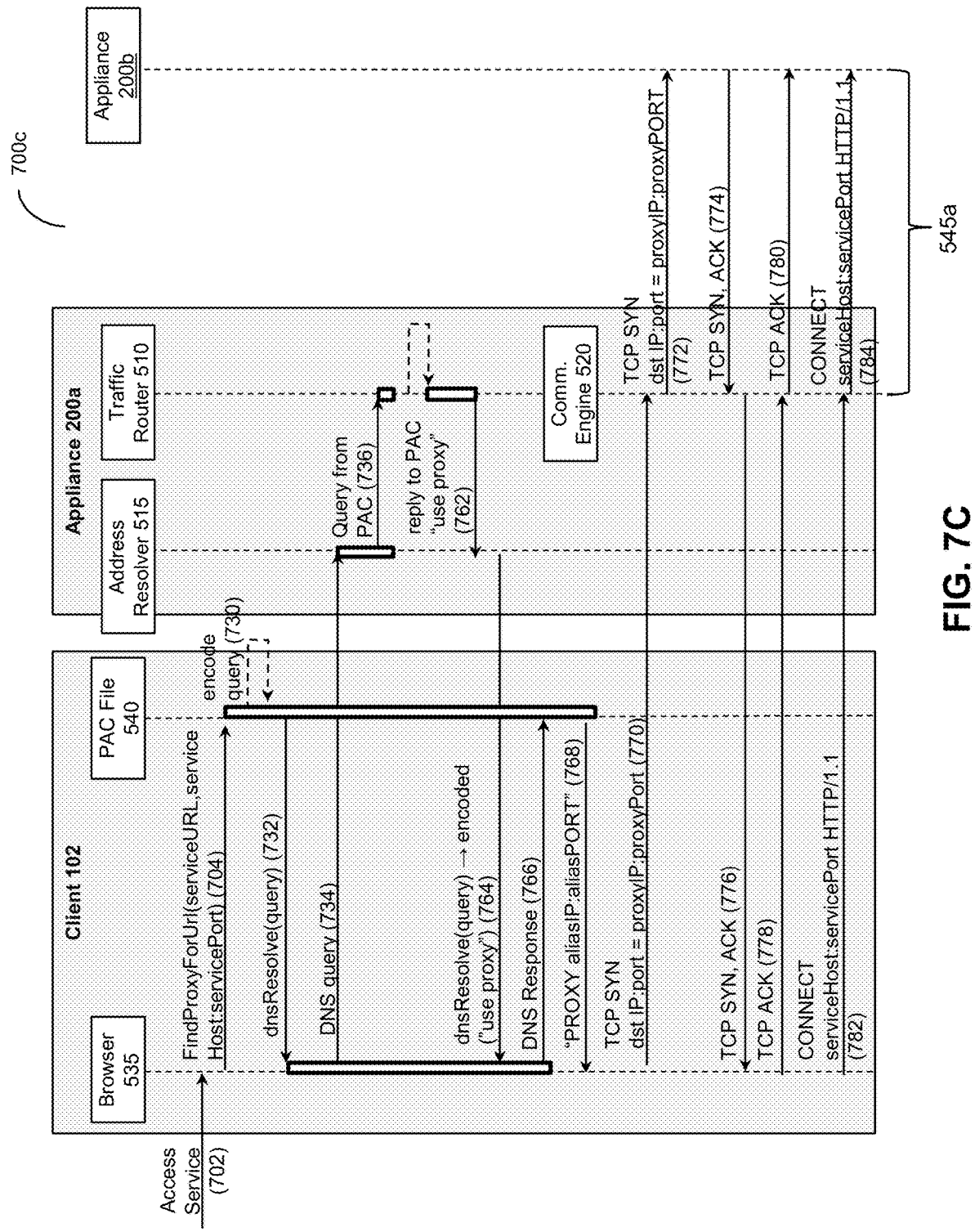

Referring now to FIG. 7C, depicted is a sequence diagram of a process 700*c* for steering network traffic using dynamically generated configuration scripts. The process 700*c* may be implemented using or performed by the components described above in FIGS. 1-6. The 700*c* may correspond to the operations performed by the client 102, the appliance 200*a*, the appliance 200*b*, and the server 106 in establishing the indirect connection 545*a* using querying. Under process 700*c*, the browser 535 may receive an access request (702). The browser 535 may invoke the PAC file 540 by calling "FindProxyForUrl(serviceURL, service Host:servicePort)" (704). The PAC file 540 may determine to encode a query (730). Based on the determination, the PAC file 540 may return a DNS resolve with the query (732). The browser 535 may send a DNS query to the appliance 200*a* (734).

The address resolver 515 may forward the query to the traffic router 510 (736). The traffic router 510 may determine to establish the indirect connection 545*a* (762). The address resolver 515 may send a DNS response indicating the indirect connection 545*a* (764). The browser 535 may invoke the PAC 540 using the DNS indicating establishment of the indirect connection 545*a* (766). The PAC file 540 may return a network address for the indirect connection 545*a* (768). Using the network address, the browser 535 may send an initiation request including an IP address and a port number to the appliance 200*b* (770). The communication engine 520 may send a connection request to the server-side appliance 200*b* (772). The server-side appliance 200*b* may in turn respond with an acknowledgement (774). The communication engine 520 may forward the acknowledgement to the client 102 (776). The client 102 may also respond with an acknowledgment to send to the appliance 200*a* to complete the three-way handshake between the client 102 and the appliance 200*a* (778). The communication engine 520 may send an acknowledgment from the client 102 to the server-side appliance 200*b* to complete the three-way handshake between the appliance 200*a* and the server-side appliance 200*b* (780). The client 102 may send a tunnel establishment request including the hostname and the port number for the server 106 to the appliance 200*a* (782). The communication engine 520 may forward the tunnel establishment request from the client 102 to the appliance 200*b* to communicate over the indirect connection 545*a* (784).

Figure 8A:
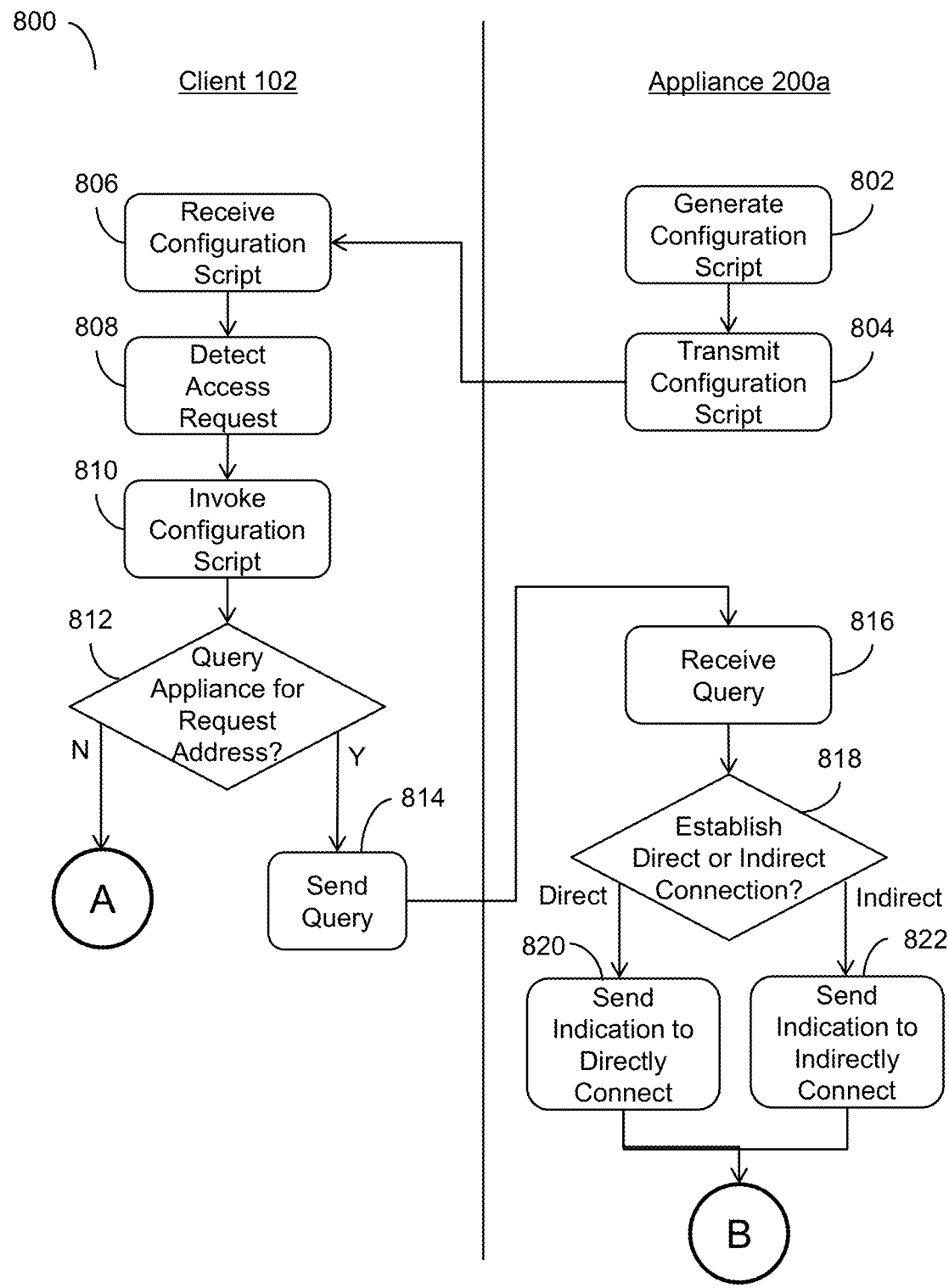
FIG. 8A-8C are flow diagrams of an embodiment of a method of steering network traffic using dynamically generated configuration scripts.
Figure 8B:
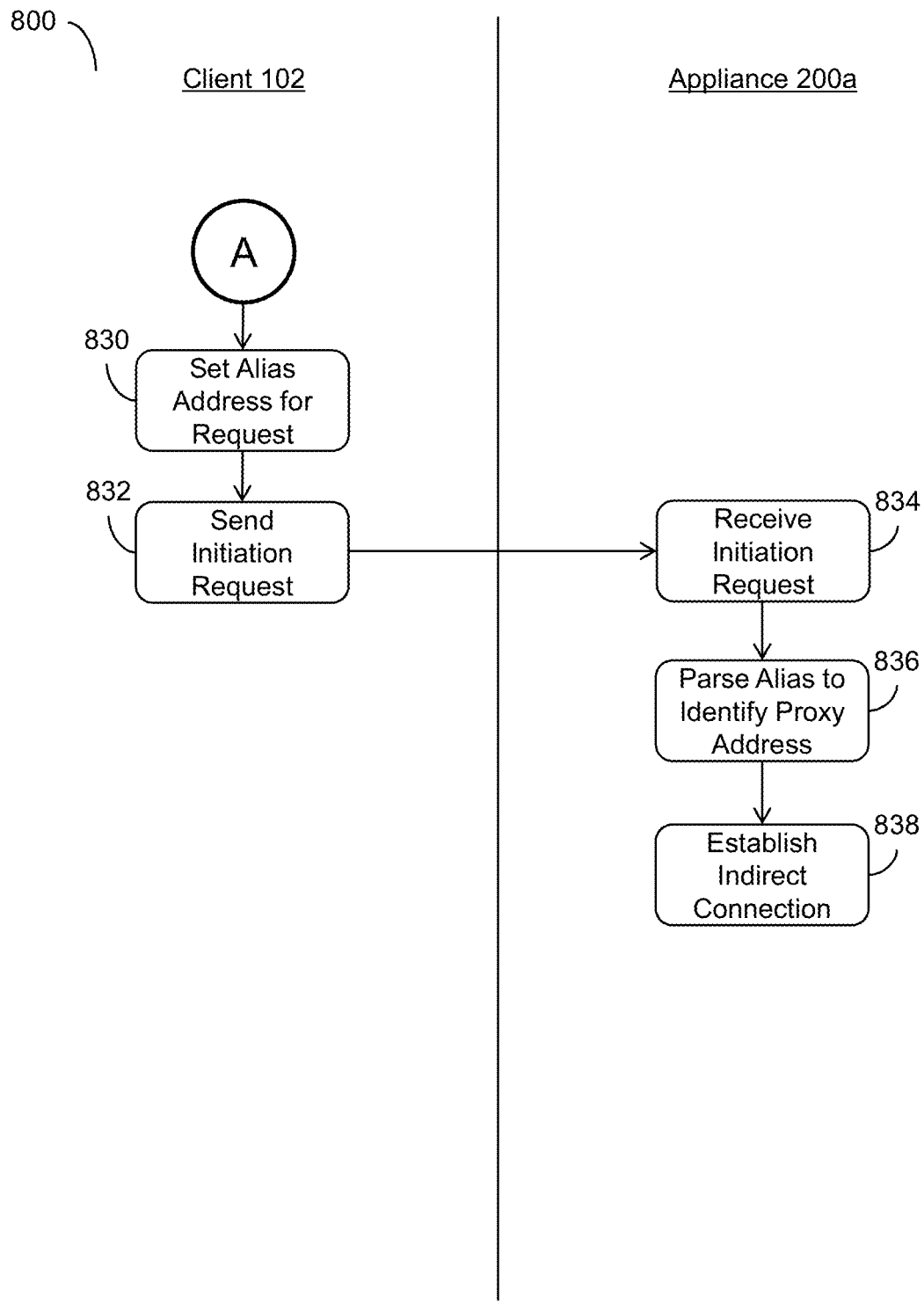
Figure 8C:
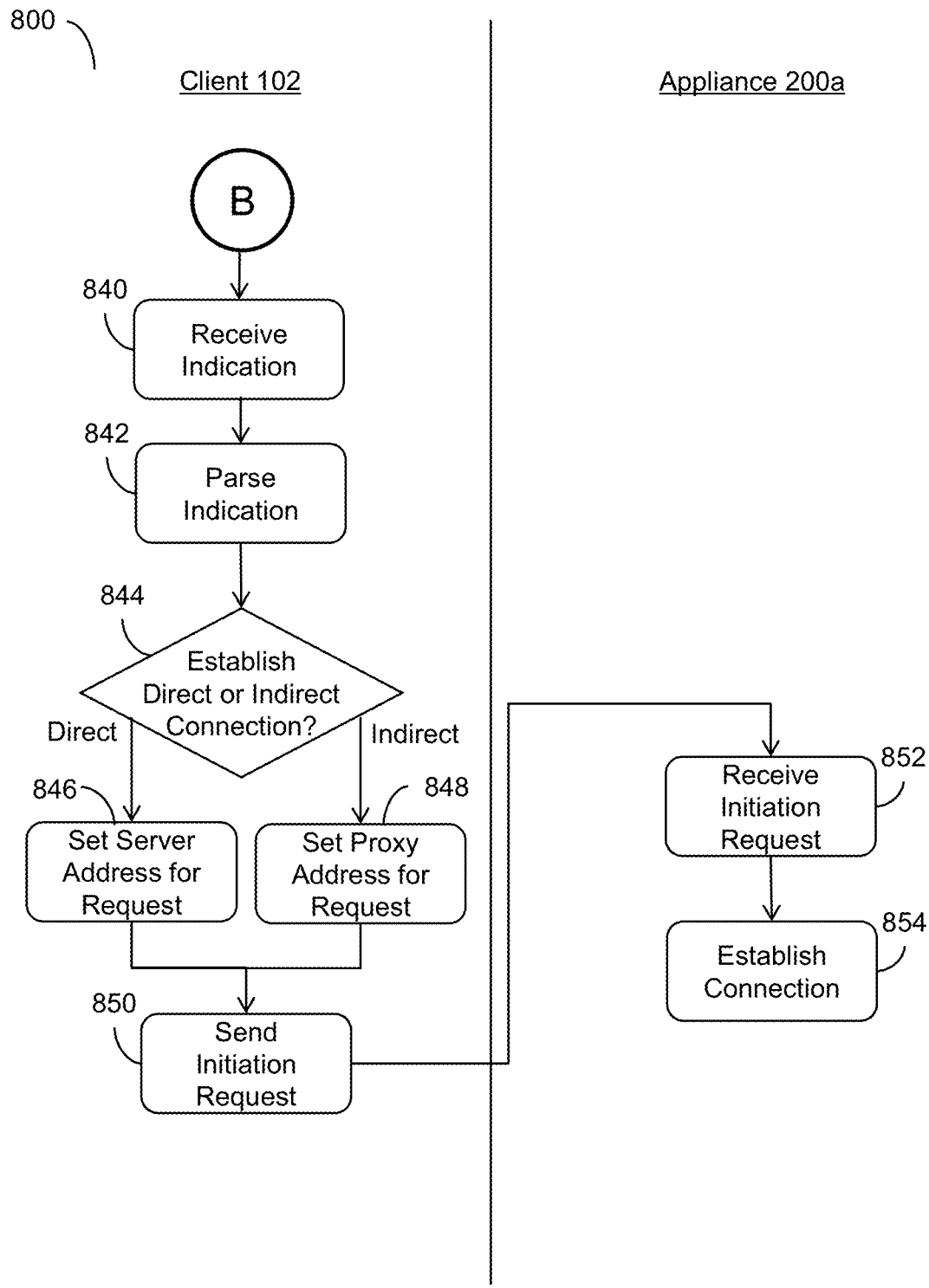

Referring now to FIGS. 8A-8C, depicted are flow diagrams for a method 800 of steering network traffic using dynamically generated configuration scripts. The functionalities of method 800 may be implemented using, or performed by, the components described in FIGS. 1-7C, such as the client 102 and appliance 200*a-n*. In overview, an appliance may generate a configuration script (802). The application may transmit the configuration script (804). A client device may receive the configuration script (806). The client may detect an access request (808). The client may invoke the configuration script (810). The client may determine whether to query the appliance for a request address (812). If the appliance is to be queried, the client may send a query (814). The appliance may receive the query (816). The appliance may determine whether to establish a direct connection or an indirect connection (818). If a direction connection is to be established, the appliance may send an indication to directly connect (820). Conversely, if an indirect connection is to be established, the appliance may send an indication to indirectly connect (822). Continuing from (814), if the appliance is not to be queried, the client may set an alias address for the request (830). The appliance may send the initiation request (832). The appliance may receive the initiation request (834). The appliance may parse the alias to identify the proxy address (836). The appliance may establish an indirect connection (838). Continuing from (820) or (822), the client may receive the indication (840). The client may parse the indication (842). The client may determine whether to establish a direct or an indirect connection (844). If a direct connection is to be established, the client may set server address for request (846). If an indirect connection is to be established, the client may set a proxy address for request (848). The client may send the initiation request (850). The appliance may receive the initiation request (852). The appliance may establish the connection (854).

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

It will be further understood that various changes in the details, materials, and arrangements of the parts that have been described and illustrated herein may be made by those skilled in the art without departing from the scope of the following claims.

We claim:

1. A method, comprising:

providing, by a first device intermediary between a client and a second device, to the client, a configuration script for connecting the client with a server via one of a direct connection with the server via the first device or an indirect connection with the server via the first device and the second device;

receiving, by the first device from the client, a request to connect with the server, the request including a first address identified by the client using the configuration script;

determining, by the first device, a second address to connect with the server based at least on the first address included in the request received from the client; and establishing, by the first device, one of the direct connection or the indirect connection between the client and the server using the second address, the established direct connection or the indirect connection used to steer traffic between the client and the server.

2. The method of claim 1, wherein the first address includes an alias address for a plurality of second devices intermediary between the first device and the server to access the resources on the server; and wherein determining the second address further comprises selecting the second device from a plurality of second devices intermediary between the first device and the server based at least on the alias address and network path criteria.

3. The method of claim 1, wherein the first address includes an alias address, the alias address including a first substring and a second substring, the first substring of the alias address corresponding a plurality of second devices intermediary between the first device and the server to access the resources on the server, the second substring of the alias address identifying service parameters to connect with the server; and wherein determining the second address further comprises selecting the second device from the plurality of second devices based at least on the second substring of the alias address and the service parameters identified from the first substring of the alias address.

4. The method of claim 1, further comprising:

receiving, by the first device from the client, a domain name system (DNS) query generated by the client in accordance with the configuration script, the DNS query including a service address for the server;

selecting, by the first device, the first address from a plurality of network addresses based at least on the determination of establishing one of the direct connection or the indirect connection using the service address, the plurality of addresses including a first network address to establish the direct connection and a second network address to the indirect connection;

providing, by the first device to the client, a DNS response including the first address to establish one of the direct connection or the indirect connection between the client and the server.

5. The method of claim 1, further comprising:

receiving, by the first device from the client, a domain name system (DNS) query generated by the client in accordance with the configuration script, the DNS query including a service address for the server; and providing, by the first device to the client, a DNS response with an indication to establish the direct connection with the server, responsive to determining to establish the direct connection based at least on the hostname.

6. The method of claim 1, further comprising:
receiving, by the first device from the client, a domain name system (DNS) query generated by the client in accordance with the configuration script, the DNS query including a service address for the server; and
providing, by the first device to the client, a DNS response with an indication to establish the indirect connection with the server via the second device, responsive to determining to establish the indirect connection based at least on the hostname.

7. The method of claim 1, further comprising:
receiving, by the first device from the client, a domain name system (DNS) query generated by the client in accordance with the configuration script, the DNS query including a service address having a hostname corresponding to the server; and
identifying, by the first device, a plurality of candidate network addresses from which to determine the first address for the server using the hostname from the DNS query.

8. The method of claim 1, wherein the configuration script includes a first proxy autoconfig (PAC) file; and further comprising:
providing, by the first device, subsequent to providing the first PAC file, a second PAC file, the second PAC file specifying the client whether to establish the direct connection or the indirect connection with the server.

9. The method of claim 1,
wherein generating the configuration script further comprises generating the configuration script using a template selected from a plurality of templates in accordance with at least one of an application profile for an application executing on the client, an account profile of a user on the application, and a network profile of the client.

10. The method of claim 1, wherein the configuration script generated for the client differs from a second configuration script generated for a second client.

11. A system, comprising:
a first device having one or more processors intermediary between a client and a second device, configured to:
provide, to the client, a configuration script for connecting the client with a server via one of a direct connection with the server via the first device or an indirect connection with the server via the first device and the second device;
receive, from the client, a request to connect with the server, the request including a first address identified by the client using the configuration script;
determine a second address to connect with the server based at least on the first address included in the request received from the client; and
establish one of the direct connection or the indirect connection between the client and the server using the second address, the established direct connection or the indirect connection used to steer traffic between the client and the server.

12. The system of claim 11, wherein the first address includes an alias address for a plurality of second devices intermediary between the first device and the server to access the resources on the server; and
wherein the first device is further configured to select the second device from a plurality of second devices intermediary between the first device and the server based at least on the alias address and network path criteria.

13. The system of claim 11, wherein the first address includes an alias address, the alias address including a first substring and a second substring, the first substring of the alias address corresponding a plurality of second devices intermediary between the first device and the server to access the resources on the server, the second substring of the alias address identifying service parameters to connect with the server; and
wherein the first device is further configured to select the second device from the plurality of second devices based at least on the second substring of the alias address the service parameters identified from the first substring of the alias address.

14. The system of claim 11, wherein the first device is further configured to:
receive, from the client, a domain name system (DNS) query generated by the client in accordance with the configuration script, the DNS query including a service address for the server;
select the first address from a plurality of network addresses based at least on the determination of establishing one of the direct connection or the indirect connection using the service address, the plurality of addresses including a first network address to establish the direct connection and a second network address to the indirect connection; and
provide, to the client, a DNS response including the first address to establish one of the direct connection or the indirect connection between the client and the server.

15. The system of claim 11, wherein the first device is further configured to:
receive, from the client, a domain name system (DNS) query generated by the client in accordance with the configuration script, the DNS query including a service address for the server;
provide, the client, a DNS response with an indication to establish the direct connection with the server, responsive to determining to establish the direct connection based at least on the hostname.

16. The system of claim 11, wherein the first device is further configured to:
receive, from the client, a domain name system (DNS) query generated by the client in accordance with the configuration script, the DNS query including a service address for the server; and
provide, to the client, a DNS response with an indication to establish the indirect connection with the server via the second device, responsive to determining to establish the indirect connection based at least on the hostname.

17. The system of claim 11, wherein the first device is further configured to:
receive, from the client, a domain name system (DNS) query generated by the client in accordance with the configuration script, the DNS query including a service address having a hostname corresponding to the server; and
identify a plurality of candidate network addresses from which to determine the first address for the server using the hostname from the DNS query.

18. The system of claim 11, wherein the configuration script includes a first proxy autoconfig (PAC) file; and
wherein the first device is further configured to provide, subsequent to provision of the first PAC file, a second PAC file, the second PAC file specifying the client whether to establish the direct connection or the indirect connection with the server.

19. The system of claim 11, wherein the first device is further configured to
   generate the configuration script using a template selected from a plurality of templates in accordance with at least one of an application profile for an application executing on the client, an account profile of a user on the application, and a network profile of the client.

20. The system of claim 11, wherein the configuration script generated for the client differs from a second configuration script generated for the second client.

* * * * *